(12) United States Patent
Gopalakrishnan et al.

(10) Patent No.: US 11,368,173 B2
(45) Date of Patent: *Jun. 21, 2022

(54) NETWORK HARDWARE DEVICES ORGANIZED IN A WIRELESS MESH NETWORK FOR CONTENT DISTRIBUTION TO CLIENT DEVICE HAVING NO INTERNET CONNECTIVITY

(71) Applicant: Amazon Technologies, Inc., Seattle, WA (US)

(72) Inventors: Varadarajan Gopalakrishnan, Cupertino, CA (US); Andrew David Price, Santa Clara, CA (US); In Chul Hyun, San Jose, CA (US); Jin Dong Kim, Santa Clara, CA (US); Subram Narasimhan, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,560

(22) Filed: Dec. 10, 2019

(65) Prior Publication Data

US 2020/0127688 A1 Apr. 23, 2020

Related U.S. Application Data

(63) Continuation of application No. 15/154,327, filed on May 13, 2016, now Pat. No. 10,523,247.

(Continued)

(51) Int. Cl.
*H01Q 1/24* (2006.01)
*H04L 67/104* (2022.01)

(Continued)

(52) U.S. Cl.
CPC .......... *H04B 1/0057* (2013.01); *H01Q 1/243* (2013.01); *H01Q 1/50* (2013.01); *H01Q 5/30* (2015.01);

(Continued)

(58) Field of Classification Search
CPC ... H04W 28/02; H04W 28/021; H04W 84/18; H04W 40/02; H04W 84/22; H04W 84/12;

(Continued)

(56) References Cited

U.S. PATENT DOCUMENTS 6,140,972 A 10/2000 Johnston et al.
7,136,655 B2 11/2006 Skafidas et al.

(Continued)

FOREIGN PATENT DOCUMENTS

CN 103765940 A 4/2014
JP 2009-038727 A1 2/2009
WO 2015042968 A1 4/2015

OTHER PUBLICATIONS

Cisco Wireless Mesh Access Points, Design and Deployment Guide, Chapter 1, Release 7.6, Published Dec. 20, 2013.

(Continued)

*Primary Examiner* — Aftab N. Khan
(74) *Attorney, Agent, or Firm* — Lowenstein Sandler LLP

(57) ABSTRACT

Wireless mesh network (WMN) architectures of network hardware devices organized in a mesh topology is described. One device communicates, using a first radio, first data with a second device via a first wireless link between the device and the second device. The device communicates, using a second radio, second data with a third device via a second wireless link between the device and the third device. The device communicates, using a third radio, third data with a fourth device via a third wireless link between the device and the fourth device. The device communicates, using a (Continued)

fourth radio, fourth data with a server of a content delivery network (CDN) via a point-to-point wireless link between the device and the server. The device is an only ingress point for content files for a mesh network that includes at least the device, the second device, and the third device.

20 Claims, 19 Drawing Sheets

Related U.S. Application Data

(60) Provisional application No. 62/288,396, filed on Jan. 28, 2016.

(51) Int. Cl.

| | | |
|---|---|---|
| *H04L 67/1097* | (2022.01) | |
| *H04W 84/22* | (2009.01) | |
| *H04B 1/00* | (2006.01) | |
| *H01Q 19/10* | (2006.01) | |
| *H01Q 19/185* | (2006.01) | |
| *H01Q 21/20* | (2006.01) | |
| *H01Q 21/24* | (2006.01) | |
| *H01Q 21/28* | (2006.01) | |
| *H04M 1/02* | (2006.01) | |
| *H01Q 5/30* | (2015.01) | |
| *H01Q 1/50* | (2006.01) | |
| *H01Q 21/29* | (2006.01) | |
| *H04L 67/1087* | (2022.01) | |
| *H04W 40/02* | (2009.01) | |
| *H04L 67/06* | (2022.01) | |
| *H04W 84/12* | (2009.01) | |
| *H04W 84/18* | (2009.01) | |

(52) U.S. Cl.
CPC .......... *H01Q 19/106* (2013.01); *H01Q 19/185* (2013.01); *H01Q 21/205* (2013.01); *H01Q 21/24* (2013.01); *H01Q 21/28* (2013.01); *H01Q 21/29* (2013.01); *H04L 67/06* (2013.01); *H04L 67/104* (2013.01); *H04L 67/1091* (2013.01); *H04L 67/1097* (2013.01); *H04M 1/026* (2013.01); *H04W 40/02* (2013.01); *H04W 84/22* (2013.01); *H04W 84/12* (2013.01); *H04W 84/18* (2013.01)

(58) Field of Classification Search
CPC ............ H01Q 1/243; H01Q 3/24; H01Q 9/14; H01Q 21/28; H01Q 19/106; H01Q 19/185; H01Q 21/205; H01Q 21/24; H01Q 5/30; H01Q 1/50; H01Q 21/29; H04B 7/0691; H04B 7/0874; H04B 1/0057; H04L 67/1091; H04L 67/06; H04L 67/104; H04L 67/1097; H04M 1/026
See application file for complete search history.

(56) References Cited

U.S. PATENT DOCUMENTS

| | | | |
|---|---|---|---|
| 7,512,404 B2 | 3/2009 | Morton et al. | |
| 8,811,369 B2* | 8/2014 | Laroia .................. | H04W 72/06 370/343 |
| 8,819,187 B1* | 8/2014 | Hofmann ............ | H04L 67/2814 709/219 |
| 9,209,523 B2 | 12/2015 | Ma et al. | |
| 9,225,069 B2 | 12/2015 | Bowers et al. | |
| 9,537,794 B2 | 1/2017 | Pettus et al. | |
| 9,693,141 B2 | 6/2017 | Sprinkle | |
| 9,887,708 B2 | 2/2018 | Hyun et al. | |
| 9,900,880 B1* | 2/2018 | Zakaria ................. | H04L 67/104 |
| 9,979,626 B2* | 5/2018 | Kish ....................... | H04L 45/00 |
| 10,193,236 B1* | 1/2019 | Lee .......................... | H01Q 3/24 |
| 10,447,378 B1* | 10/2019 | Kim ...................... | H04W 88/10 |
| 10,530,858 B1* | 1/2020 | Parulkar ............. | H04L 67/1095 |
| 10,609,620 B1* | 3/2020 | Wong .................... | H04W 84/18 |
| 10,750,433 B1* | 8/2020 | Shukla ................. | H04W 24/04 |
| 2002/0107024 A1* | 8/2002 | Dev Roy .............. | H04W 16/12 455/447 |
| 2002/0113743 A1 | 8/2002 | Judd et al. | |
| 2002/0159409 A1* | 10/2002 | Wolfe ................... | H04W 92/20 370/329 |
| 2003/0087645 A1* | 5/2003 | Kim ...................... | H04W 28/16 455/453 |
| 2004/0102222 A1* | 5/2004 | Skafidas ............... | H04W 16/28 455/562.1 |
| 2004/0259558 A1* | 12/2004 | Skafidas ............... | H04W 72/04 455/450 |
| 2004/0259563 A1* | 12/2004 | Morton ................. | H04W 16/14 455/452.2 |
| 2005/0017912 A1 | 1/2005 | Azoulay et al. | |
| 2010/0119002 A1 | 5/2010 | Hartenstein | |
| 2010/0231476 A1 | 9/2010 | Chiang et al. | |
| 2011/0250926 A1* | 10/2011 | Wietfeldt ................. | H01Q 9/14 455/525 |
| 2012/0295543 A1 | 11/2012 | Rofougaran et al. | |
| 2014/0177472 A1* | 6/2014 | Halasz ................ | H04L 67/1091 370/255 |
| 2014/0310427 A1 | 10/2014 | Shaw et al. | |
| 2015/0036656 A1 | 2/2015 | McCarthy et al. | |
| 2015/0215011 A1 | 7/2015 | Hartenstein | |
| 2015/0222025 A1 | 8/2015 | Song et al. | |
| 2016/0104942 A1 | 4/2016 | Pera et al. | |
| 2016/0119240 A1* | 4/2016 | Ross ....................... | H04L 63/18 370/235 |
| 2016/0173576 A1* | 6/2016 | Hayden ................... | H04L 67/02 709/203 |
| 2016/0308959 A1 | 10/2016 | Richardson et al. | |
| 2017/0187811 A1 | 6/2017 | Thomee | |
| 2017/0223090 A1 | 8/2017 | Gopalakrishnan et al. | |
| 2017/0223102 A1 | 8/2017 | Lee et al. | |
| 2017/0366458 A1* | 12/2017 | Chan ..................... | H04L 45/021 |

OTHER PUBLICATIONS

International Search Report and Written Opinion dated Jun. 1, 2017, on application No. PCT/US 2017/013532.

\* cited by examiner

NETWORK HARDWARE DEVICES ORGANIZED IN A WIRELESS MESH NETWORK FOR CONTENT DISTRIBUTION TO CLIENT DEVICE HAVING NO INTERNET CONNECTIVITY

RELATED APPLICATIONS

This application is a continuation application of U.S. patent application Ser. No. 15/154,327, filed May 13, 2016, which claims the benefit of U.S. Provisional Application 62/288,396, filed Jan. 28, 2016, the entire contents of both are incorporated by reference herein. This application is related to U.S. Pat. No. 9,887,708, issued Feb. 6, 2018, and U.S. patent application Ser. No. 15/154,339, filed May 13, 2016.

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
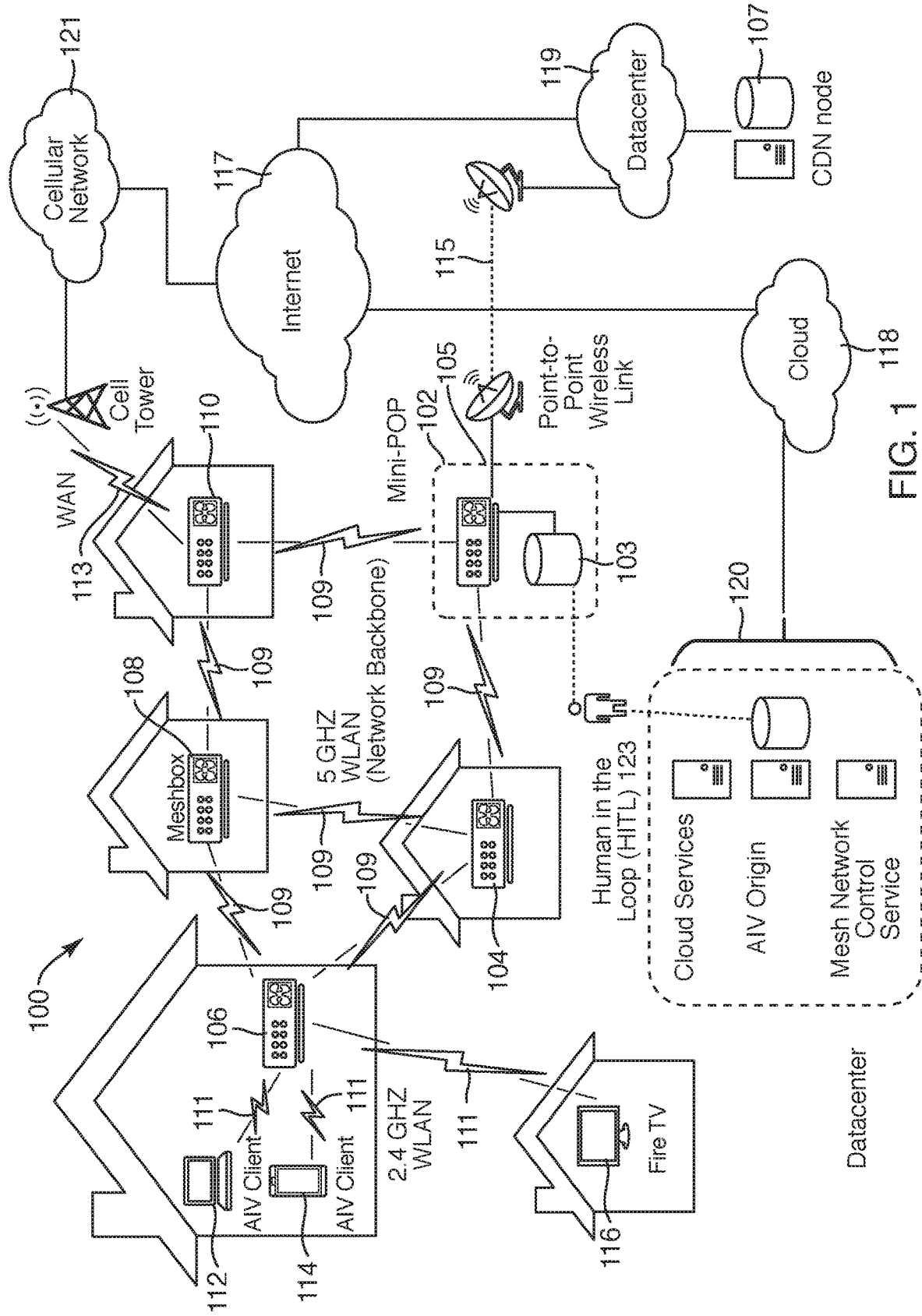
FIG. 1 is a network diagram of network hardware devices organized in a wireless mesh network (WMN) for content distribution to client devices in an environment of limited connectivity to broadband Internet infrastructure according to one embodiment.

A wireless mesh network (WMN) containing multiple mesh network devices, organized in a mesh topology, is described. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations.

One system of devices organized in a WMN includes a first network hardware device having at least one of a point-to-point wireless link to access content files over the Internet or a wired connection to access the content files stored on a storage device coupled to the first network hardware device. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a mesh network control service (MNCS) device by cellular connections. The cellular connections may have lower bandwidths than the point-to-point wireless link. A second network hardware device is wirelessly connected to the first network hardware device over a first P2P connection. During operation, the second network hardware device is wirelessly connected to a first client consumption device over a first N2C connection. The second network hardware device receives a first request for a first content file from the first client consumption device over the first N2C connection. The second hardware device sends a second request for the first content file to the first network hardware device over the first P2P connection. The second hardware device receives the first content file from the first network hardware device over the first P2P connection and sends the first content file to the first client consumption device over the first N2C connection. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) devices (nodes) that do have access to the Internet, but the majority of mesh network devices is capable of forwarding broadband mesh traffic between the mesh network devices for delivering content to client consumption devices that would otherwise not have broadband connections to the Internet. Alternatively, instead of POP devices having access to broadband Internet infrastructure, the POP device is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

Figure 2:
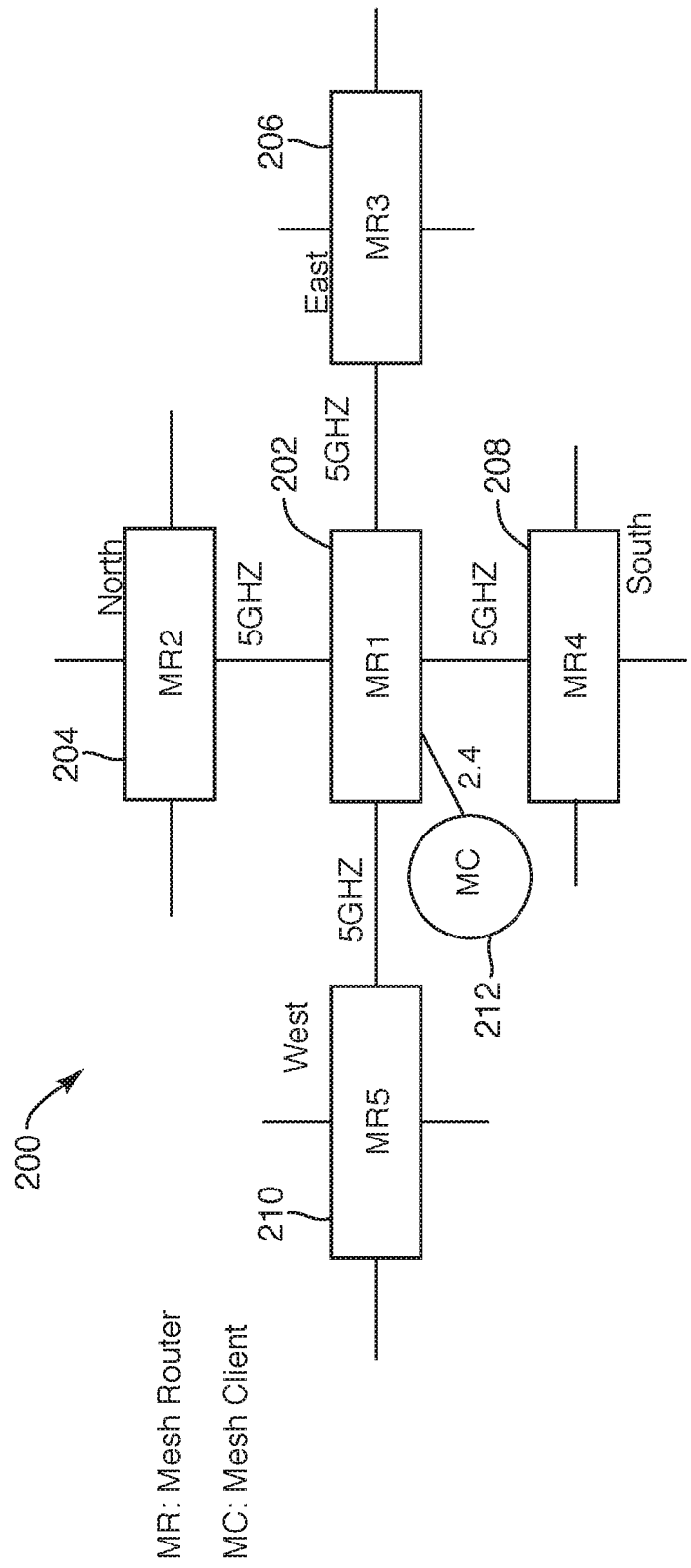
FIG. 2 is a block diagram of a network hardware device with five radios operating concurrently in a WMN according to one embodiment.

FIGS. 1-3 are generally directed to network hardware devices, organized in a wireless mesh network, for content distribution to client consumption devices in environments of limited connectivity to broadband internet infrastructure. FIGS. 4-7 are generally directed to embodiments of antenna switching circuitry of a mesh network device. FIGS. 8-17 are generally directed to embodiments of antenna structures and reflective chambers of a multi-radio, multi-channel (MRMC) mesh network device.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wirelessly connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

FIG. 2 is a block diagram of a network hardware device 202 with five radios operating concurrently in a wireless mesh network 200 according to one embodiment. The wireless mesh network 200 includes multiple network hardware devices 202-210. The network hardware device 202 may be considered a mesh router that includes four 5 GHz radios for the network backbone for multiple connections with other mesh routers, i.e., network hardware devices 204-210. For example, the network hardware device 204 may be located to the north of the network hardware device 202 and connected over a first 5 GHz connection. The network hardware device 206 may be located to the east of the network hardware device 202 and connected over a second 5 GHz connection. The network hardware device 208 may be located to the south of the network hardware device 202 and connected over a third 5 GHz connection. The network hardware device 210 may be located to the west of the network hardware device 202 and connected over a fourth 5 GHz connection. In other embodiments, additional network hardware devices can be connected to other 5 GHz connections of the network hardware device 202. It should also be noted that the network hardware devices 204-210 may also connect to other network hardware devices using its respective radios. It should also be noted that the locations of the network hardware devices 20-210 can be in other locations that north, south, east, and west. For example, the network hardware devices can be located above or below the mesh network device 202, such as on another floor of a building or house.

The network hardware device 202 also includes at least one 2.4 GHz connection to serve client consumption devices, such as the client consumption device 212 connected to the network hardware device 202. The network hardware device 202 may operate as a mesh router that has five radios operating concurrently or simultaneously to transfer mesh network traffic, as well as service connected client consumption devices. This may require that the 5GLL and 5GLH to be operating simultaneously and the 5GHL and 5GHH to be operating simultaneously, as described in more detail below. It should be noted that although the depicted embodiment illustrates and describes five mesh nodes, in other embodiments, more than five mesh nodes may be used in the WMN. It should be noted that FIG. 2 is a simplification of neighboring mesh network devices for a given mesh network device. The deployment of forty or more mesh network device may actually be located at various directions than simply north, south, east, and west as illustrated in FIG. 2. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 3A:
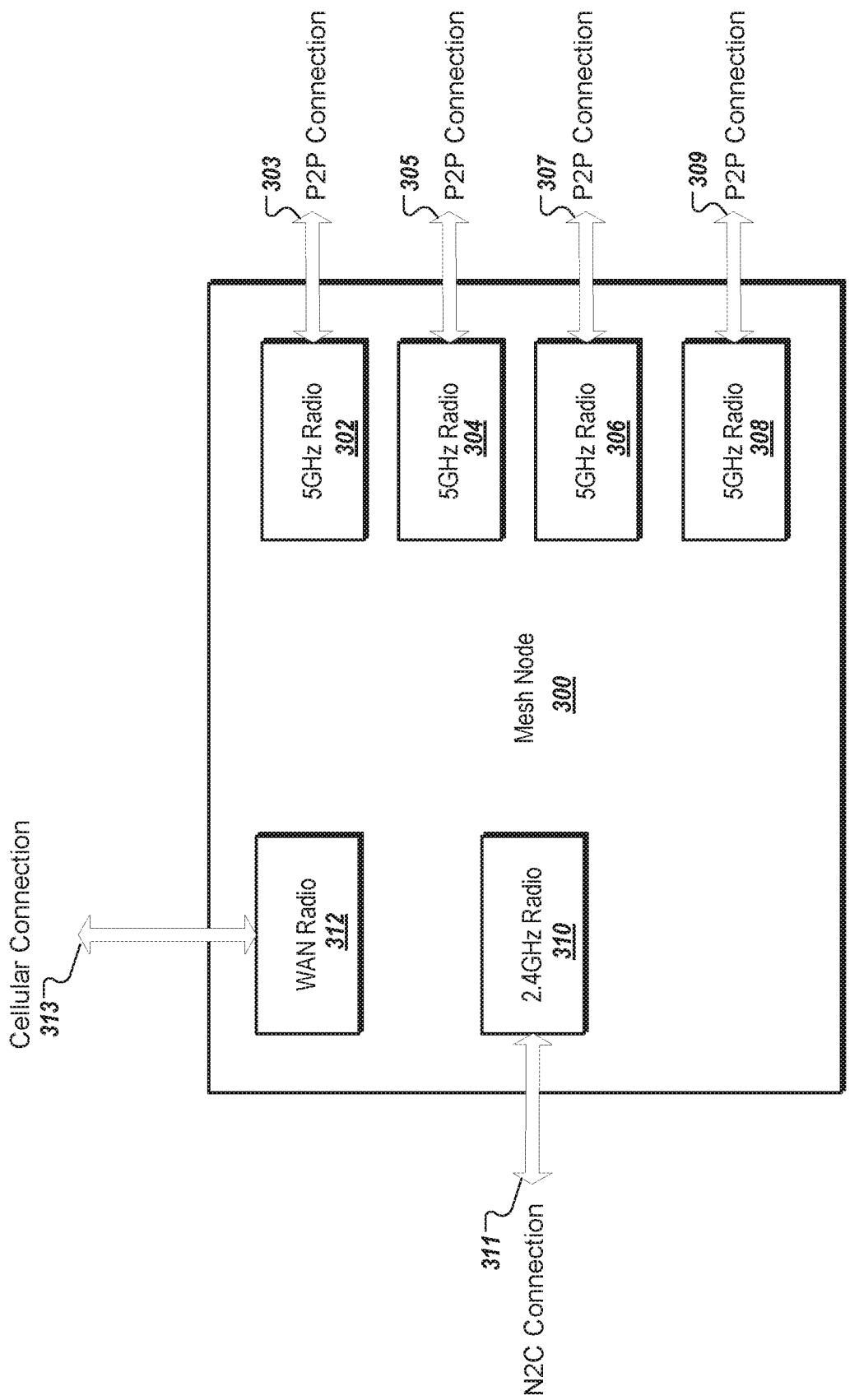
FIG. 3A is a block diagram of a mesh node with multiple radios according to one embodiment.

FIG. 3A is a block diagram of a mesh node 300 with multiple radios according to one embodiment. The mesh node 300 includes a first 5 GHz radio 302, a second 5 GHz radio 304, a third 5 GHz radio 306, a fourth 5 GHz radio 308, a 2.4 GHz radio 310, and a cellular radio 312. The first 5 GHz radio 302 creates a first P2P wireless connection 303 between the mesh node 300 and another mesh node (not illustrated) in a WMN. The second 5 GHz radio 304 creates a second P2P wireless connection 305 between the mesh node 300 and another mesh node (not illustrated) in the WMN. The third 5 GHz radio 306 creates a third P2P wireless connection 307 between the mesh node 300 and another mesh node (not illustrated) in the WMN. The fourth 5 GHz radio 308 creates a fourth P2P wireless connection 309 between the mesh node 300 and another mesh node (not illustrated) in the WMN. The 2.4 GHz radio 310 creates a N2C wireless connection 311 between the mesh node 300 and a client consumption device (not illustrated) in the WMN. The cellular radio 312 creates a cellular connection between the mesh node 300 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In another embodiment, a system of devices can be organized in a WMN. The system may include a single ingress node for ingress of content files into the wireless mesh network. In one embodiment, the single ingress node is a mini-POP device that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection. The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the first network hardware device is further to receive a third request for a second content file from a second client consumption device connected to the first network hardware device over a second N2C connection between the first network hardware device and the second client consumption device. The first network hardware device sends a fourth request for the second content file stored at a third network hardware device through the network backbone via a second set of zero or more intervening network hardware devices between the first network hardware device and the third network hardware device. The first network hardware device receives the second content file from the third network hardware device through the network backbone via the second set of zero or more intervening network hardware devices. The first network hardware device sends the second content file to the second client consumption device over the second N2C connection.

In one embodiment, the zero or more intervening network hardware devices of the first set are not the same as the zero or more intervening network hardware devices of the second set. In some embodiments, a path between the first network hardware device and the second network hardware device could include zero or more hops of intervening network hardware devices. In some cases, the path may include up to 12-15 hops within a mesh network of 100×100 network hardware devices deployed in the WMN. In some embodiments, a number of network hardware devices in the WMN is greater than fifty. The WMN may include hundreds, thousands, and even tens of thousands of network hardware devices.

In a further embodiment, the first network hardware device receive the fourth request for the second content file from a fourth network hardware device through the network backbone via a third set of zero or more intervening network hardware devices between the first network hardware device and the fourth network hardware device. The first network hardware device sends the second content file to the fourth network hardware device through the network backbone via the third set of zero or more intervening network hardware devices.

In some embodiments, the first network hardware device determines whether the first content file is stored in memory of the first network hardware device. The memory of the first network hardware device may be volatile memory, non-volatile memory, or a combination of both. When the first content file is not stored in the memory or the storage of the first network hardware device, the first network hardware device generates and sends the second request to a first network hardware device of the first set. Intervening network hardware devices can make similar determinations to locate the first content file in the WMN. In the event that the first content file is not stored in the second network hardware device or any intervening nodes, the second network hardware device can request the first content file from the mini-POP device, as described herein. When the mini-POP device does not store the first content file, the mini-POP can take action to obtain the first content file, such as requesting the first content file from a CDN over a point-to-point link. Alternatively, the human in the loop process can be initiated as described herein.

In a further embodiment, the second network hardware device receives the second request for the first content file and retrieves the first content file from the single ingress node when the first content file is not previously stored at the second network hardware device. The second network hardware device sends a response to the second request with the first content file retrieved from the single ingress node. The second network hardware device may store a copy of the first content file in memory of the second network hardware device for a time period.

In another embodiment, the single ingress node receives a request for a content file from one of the multiple network hardware devices over a P2P wireless connection. The request originates from a requesting consumption device. It should be noted that a video client can be installed on the client consumption device, on the network hardware device, or both. The single ingress node determines whether the content file is stored in a storage device coupled to the single ingress node. The single ingress node generates and sends a first notification to the requesting one of the network hardware devices over the P2P wireless connection when the content file is not stored in the storage device. The first notification includes information to indicate an estimated delay for the content file to be available for delivery. The single ingress node generates and sends a second notification to an operator of the first network hardware device. The second notification includes information to indicate that the content file has been requested by the requesting client consumption device. In this embodiment, the notifications can be pushed to the appropriate recipients. In another embodiment, an operator can request which content files had been requested in the WMN and not serviced. This can initiate the ingress of the content file into the WMN, even if with a longer delay.

In some embodiments, the mini-POP device is coupled to a storage device to store the content files as original content files for the wireless mesh network. A point-to-point wireless link may be established between the mini-POP device and a CDN device. In another embodiment, the mini-POP device is coupled to a node of a content delivery network (CDN) via a microwave communication channel.

In a further embodiment, the second network hardware device can wirelessly connect to a third network hardware device over a second P2P connection. During operation, the third network hardware device may receive a third request for a second content file from a second client consumption device over a second N2C connection between the third network hardware device and the second client consumption device. The third network hardware device sends a fourth request for the second content file to the second network hardware device over the second P2P connection. The third network hardware device receives the second content file from the second network hardware device over the second P2P connection and sends the second content file to the second client consumption device over the second N2C connection.

In another embodiment, the first network hardware device receives the fourth request for the second content file from the third network hardware device. The second network hardware device determines whether the second content file is stored in memory of the second network hardware device. The second network hardware device sends a fifth request to the first network hardware device over the first P2P connection and receive the second content file over the first P2P connection from the first network hardware device when the second content file is not stored in the memory of the second network hardware device. The second network hardware device sends the second content file to the third network hardware device over the second P2P connection.

In another embodiment, the second network hardware device may wirelessly connect to a third network hardware device over a second P2P connection. During operation, the third network hardware device may receive a third request for the first content file from a second client consumption device over a second N2C connection between the third network hardware device and the second client consumption device. The third network hardware device sends a fourth request for the first content file to the second network hardware device over the second P2P connection. The third network hardware device receives the first content file from the first network hardware device over the second P2P connection and sends the first content file to the second client consumption device over the second N2C connection.

In another embodiment, the first network hardware device receives a request for a content file from one of the network hardware devices over one of the P2P wireless connections. The request is from a requesting client consumption device connected to one of the multiple network hardware devices. The first network hardware device determines whether the content file is stored in the storage device. The first network hardware device generates and sends a first notification to the one of the network hardware devices over the one of the P2P wireless connections when the content file is not stored in the storage device. The first notification may include information to indicate an estimated delay for the content file to be available for delivery. The first network hardware device generates and sends a second notification to an operator of the first network hardware device. The second notification may include information to indicate that the content file has been requested by the requesting client consumption device.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP) node and a point-to-point wireless link is established between the mini-POP device and a POP device of an ISP. In one embodiment, the point-to-point wireless link is a microwave link (e.g., directional microwave link) between the mini-POP device and the CDN device. In another embodiment, the mini-POP device stores an index of the content files store in attached storage devices.

In some embodiments, a mesh network architecture includes multiple mesh nodes organized in a self-contained mesh network. The self-contained mesh network may be self-contained in the sense that content resides in, travels through, and is consumed by nodes in the mesh network without requiring the content to be fetched outside of the mesh network. Each of the mesh nodes includes a first radio for inter-node communications with the other nodes on multiple P2P channels, a second radio for communications with client consumption devices on N2C channels. The mesh network architecture also includes a mini-POP device including a radio for inter-connection communications with at least one of the mesh nodes on a P2P channel. The mesh network architecture also includes a storage device coupled to the mini-POP, the storage device to store content files for distribution to a requesting client consumption device. The mini-POP device may be the only ingress point for content files for the self-contained mesh network. The storage devices of the mini-POP device may be internal drives, external drives, or both. During operation, a first node of the mesh nodes includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In another embodiment, the first node stores a copy of the content file in a storage device at the first node. The first node receives a third request for the content file directly from a second client consumption device via a second N2C channel between the first node and the second client consumption device. The first node sends the copy of the content file to the second client consumption device via the second N2C channel in response to the third request.

In a further embodiment, the first node receives the content file via the second P2P channel in response to the second request and sends the content file to the requesting client consumption device via the first N2C channel or the first P2P channel in response to the first request. In some embodiments, the second path and the first path are the same.

In a further embodiment, the first node includes a third radio to communicate control data over a cellular connection between the first node and a mesh network control service (MNCS) device.

In one embodiment, the second radio can operate with 2×2 MIMO with maximum 40 MHz aggregation. This may result in per radio throughput of not more than 300 Mbps in 5 GHz and 150 Mbps in 2.4 GHz. Even with 5 radios (4×5 GHz and 1×2.4), the peak physical layer throughput will not need to be more than 1.4 Gbps. A scaling factor of 1.4 may be used to arrive at a CPU frequency requirement. This implies the total processing clock speed in the CPU should not be less than 1.96 GHz (1.4×1.4=1.96 GHz). For example, the Indian ISM band has a requirement of 23 dBm EIRP. Since the WMN 100 needs to function under conditions where the mesh routers communicate with each other between homes, the propagation loss through multiple walls and over distances between homes, the link budget does not support sensitivity requirements for 802.11ac data rates. The per-node throughput may be limited to 300 Mbps per link—peak PHY rate.

In another embodiment, a system includes a POP device having access to content files via at least one of data storage coupled to the POP device or a first point-to-point connection to a first device of an ISP. The system also includes multiple mesh nodes, organized in a WMN, and at least one of the mesh nodes is wirelessly coupled to the POP device. The WMN is a mesh topology in which the multiple mesh nodes cooperate in distribution of the content files to client consumption devices that do not have access to reliable access to the server device of the CDN or in an environment of limited connectivity to broadband infrastructure. A first node of the multiple mesh nodes is a multi-radio, multi-channel (MRMC) device that includes multiple P2P connections to form parts of a network backbone in which the first node wireless connects to other mesh nodes via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

Figure 3B:
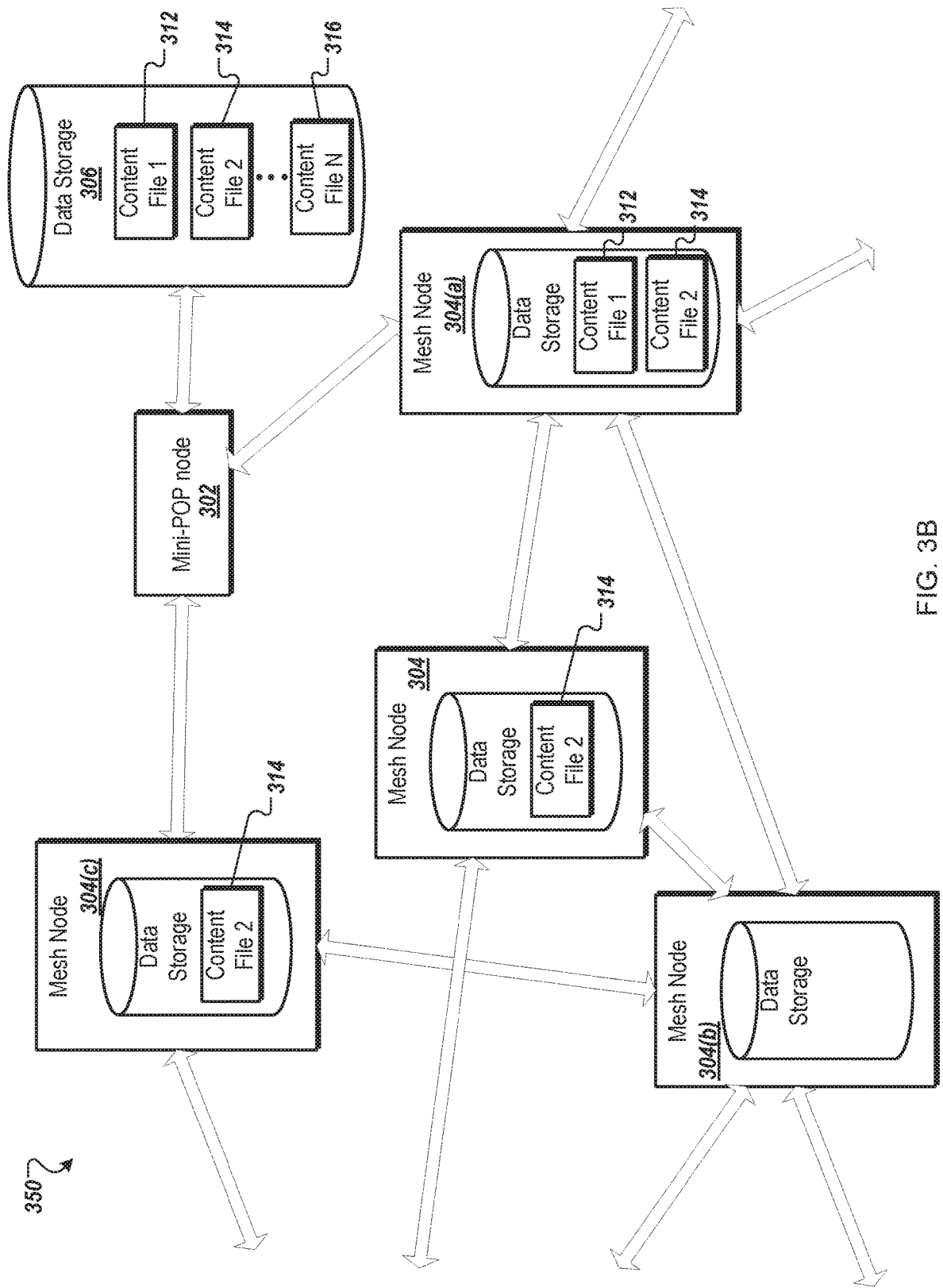
FIG. 3B is a network diagram of a WMN in which multiple content files are stored at different locations according to one embodiment.

FIG. 3B is a network diagram of a WMN 300 in which multiple content files are stored at different locations according to one embodiment. As described herein, the WMN 300 described herein can operate like a CDN in storing and caching digital content for delivery of the content to client devices. As depicted, the WMN 300 includes a mini-POP device 302 and multiple mesh nodes 304. The mini-POP device 302 is coupled to one or more data storage devices 306. The storage device(s) 306 store copies of multiple content files, including a first content file 312, a second content file 314, and an Nth content file 316, where N is some positive integer value. These content files 312, 314, 316 can be considered the original content files in the WMN 300. These content files 312, 314, 316 can be different types of content as well, such as video, audio, literature, or the like. For example, the first content file 312 may be a movie, including video and audio content, and the second content file 314 may be an e-book. Copies of the content files can be stored at various locations in the WMN 300. For example, the mesh node 304(a) stores a copy of the first content file 312 and a copy of the second content file 314. The mesh node 304(a) may store other content files as well. The mesh node 304(b) can request the second content file 314 from any one of the mesh nodes 304 storing the second content file 314, such as the mesh node 304(c) or the mesh node 304(b). In the event that none of the mesh nodes 304 have cached the second content file 314, the mesh node 304(b) can request the second content file 314 from the mini-POP device 302 via one or more of the mesh nodes 304. Similarly, the mesh node 304(c) can request the first content file 312 from the mesh nodes that have cached the first content file 312, such as the mesh node 304(a). In some cases, the WMN 300 may include hundreds or thousands of mesh nodes 304 that can store copies of different ones of the content files 312-316.

The caching of the content files within the WMN 300 can be done according to caching schemes, such as those used in CDNs.

Figure 4:
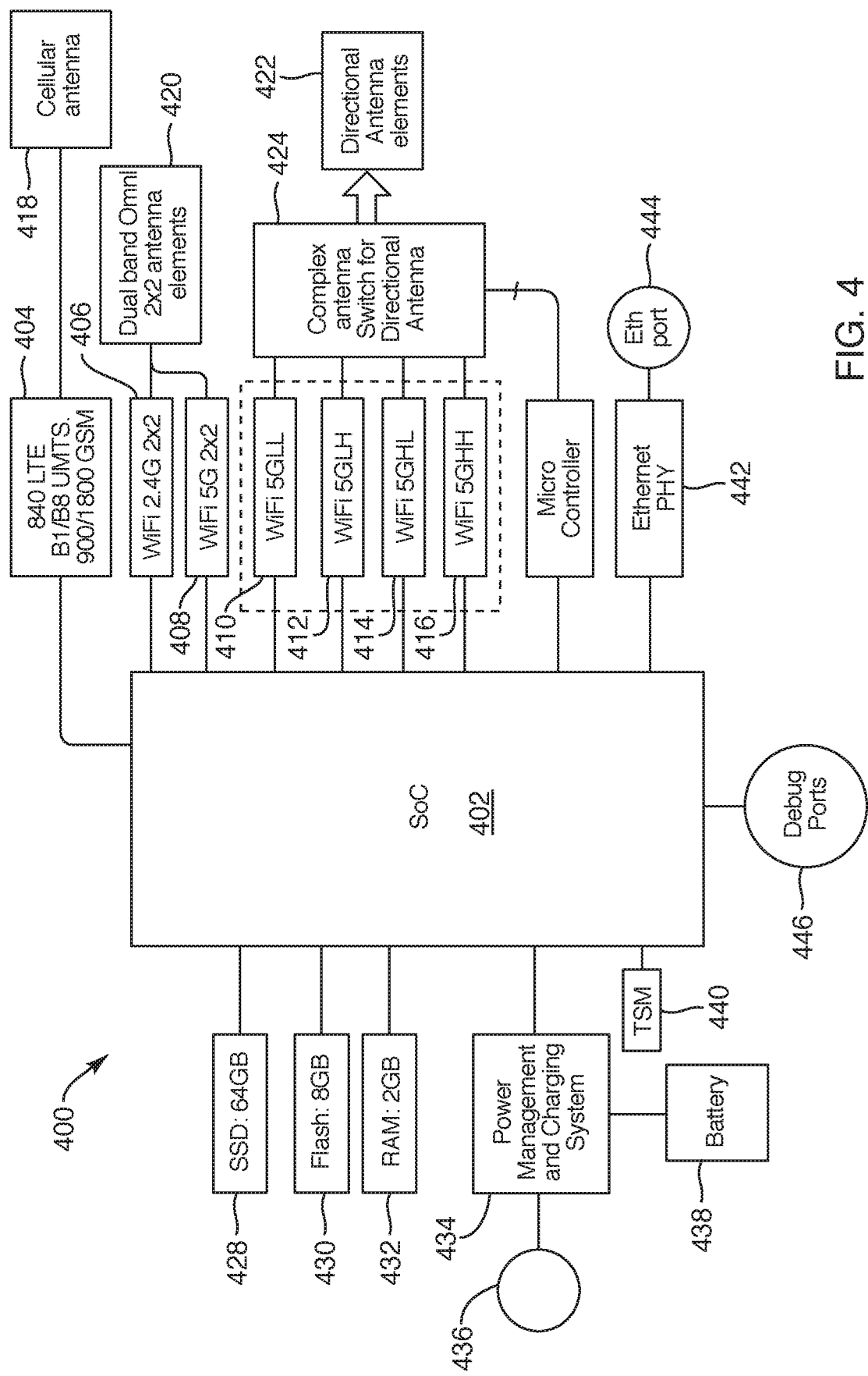
FIG. 4 is a block diagram of a mesh network device according to one embodiment.

FIG. 4 is a block diagram of a mesh network device 400 according to one embodiment. The mesh network device 400 may be one of many mesh network devices organized in a WMN (e.g., WMN 100). The mesh network device 400 is one of the nodes in a mesh topology in which the mesh network device 400 cooperates with other mesh network devices in distribution of content files to client consumption devices in an environment of limited connectivity to broadband Internet infrastructure, as described herein. That is, the client consumption devices do not have Internet connectivity. The mesh network device 400 may be the mini-POP device 102 of FIG. 1. Alternatively, the mesh network device 400 may be any one of the mesh network devices 104-110 of FIG. 1. In another embodiment, the mesh network device 400 is any one of the network hardware devices 202-210 of FIG. 2. In another embodiment, the mesh network device 400 is the mesh node 300 of FIG. 3A. In another embodiment, the mesh network device 400 is the mesh node 304 of FIG. 3B.

The mesh network device 400 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF radio 404 (e.g., HSCI interface for cellular radio (3G)), a second interface to the WLAN 2.4 GHz radio 406, a third interface to the WLAN 2.4 GHz radio 408, and multiple interfaces to the WLAN 5 GHz radios, such as on a PCIe bus. Alternatively, the SoC 402 includes as many digital interfaces for as many radios there are in the mesh network device 400. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 400 may include an application processor that is not necessarily considered to be a SoC.

The mesh network device 400 may also include memory and storage. For example, the mesh network device 400 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 400 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 400. Although the Ethernet port 444 could provide wired connections to client devices, the primary purpose of the Ethernet port 444 is not to connect to client devices, since the 2.4 GHz connections are used to connect to clients in the WMN. The mesh network device 400 may also include one or more debug ports 446, which are coupled to the SoC 402. The memory and storage may be used to cache content, as well as store software, firmware or other data for the mesh network device 400.

The mesh network device 400 may also include a power management and charging system 434. The power management and charging system 434 can be connected to a power supply 436 (e.g., a 240V outlet, a 120V outlet, or the like). The power management and charging system 434 can also connect to a battery 438. The battery 438 can provide power in the event of power loss. The power management and charging system 434 can be configured to send a SOS message on power outage and backup system state. For example, the WLAN radios can be powered down, but the cellular radio can be powered by the battery 438 to send the SOS message. The battery 438 can provide limited operations by the mesh network device 400, such as for 10 minutes before the entire system is completely powered down. In some cases, power outage will likely affect a geographic area in which the mesh network device 400 is deployed (e.g., power outage that is a neighborhood wide phenomenon). The best option may be to power down the mesh network device 400 and let the cloud service (e.g., back end service) know of the outage in the WMN. The power management and charging system 434 may provide a 15V power supply up to 21 watts to the SoC 402. Alternatively, the mesh network device 400 may include more or less components to operate the multiple antennas as described herein.

The mesh network device 400 includes a first radio frequency (RF) radio 404 coupled between the SoC 402 and a cellular antenna 418. The first RF radio 404 supports cellular connectivity using the cellular antenna 418. In one embodiment, the first RF radio 404 is a wireless wide area network (WWAN) radio and the cellular antenna 418 is a WWAN antenna. WWAN is a form of wireless network that is larger in size than a WLAN and uses different wireless technologies. The wireless network can deliver date in the form of telephone calls, web pages, texts, messages, streaming content, or the like. The WWAN radio may use mobile telecommunication cellular network technologies, such as LTE, WiMAX (also called wireless metropolitan area network (WMAN), UTMS, CDMA2000, GSM, cellular digital packet data (CDPD), Mobitex, or the like, to transfer data. In one embodiment, the cellular antenna 418 may include a structure that includes a primary WAN antenna and a secondary WAN antenna. The first RF radio 404 may be a wireless wide area network (WWAN) radio and the cellular antenna 418 is a WWAN antenna. The first RF radio 404 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF radio 404 may support other bands, as well as other cellular technologies. The mesh network device 400 may include a GPS antenna and corresponding GPS radio to track the location of the mesh network device 400, such as moves between homes. However, the mesh network device 400 is intended to be located inside a structure, the GPS antenna and radio may not be used in some embodiments.

The mesh network device 400 includes a first set of wireless local area network (WLAN) radios 406, 408 coupled between the SoC 402 and dual-band omni-directional antennas 420. A first WLAN radio 406 may support WLAN connectivity in a first frequency range using one of the dual-band omni-directional antennas 420. A second WLAN radio 408 may support WLAN connectivity in a second frequency range using one of the dual-band omni-directional antennas 420. The dual-band omni-directional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omni-directional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 400 includes a second set of WLAN radios 410-416 coupled between the SoC 402 and antenna switching circuitry 424. The second set of WLAN radios 410-416 support WLAN connectivity in the second frequency range using a set of directional antennas 422. The second set of WLAN radios 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 400 and the other mesh network devices, the client consumption devices, or both. For example, the micro controller 426 can select different combinations of the set of directional antennas 422. In one embodiment, the SoC 402 runs a mesh selection algorithm to decide which communication path to use for any particular communication and instructs, or otherwise commands, the micro controller 426 to select the appropriate communication path between a selected radio and a selected antenna. Alternatively, the micro controller 426 can receive indications from the SoC 402 of which radio is to be operating and the micro controller 426 can select an appropriate communication path between a radio (or a channel of the radio) and an appropriate antenna. The antenna switching circuitry 424 is described in more detail below with respect to FIGS. 5-7.

In another embodiment, a filter switch bank is coupled between the antenna switching circuitry 424 and the second set of WLAN radios 410-416. In another embodiment, the filter switch bank can be implemented within the antenna switching circuitry 424.

In the depicted embodiment, the first set of WLAN radios include a 2×2 2.4 GHz MIMO radio 406 and a first 2×2 5 GHz MIMO radio 408. The second set of WLAN radios includes a second 2×2 5 GHz MIMO radio 410 ("5GLL"), a third 2×2 5 GHz MIMO radio 412 ("5GLH"), a fourth 2×2 5 GHz MIMO radio 414 ("5GHL"), and a fifth 2×2 5 GHz MIMO radio 416 ("5GHH"). The dual-band omni-directional antennas 420 may include a first omni-directional antenna and a second omni-directional antenna (not individually illustrated in FIG. 4). The set of directional antennas 422 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth vertical orientation antenna (upper antenna described herein); a ninth horizontal antenna (upper antenna); an tenth horizontal antenna (bottom antenna); and a tenth vertical antenna (bottom antenna). These last four antennas may also be RHC orientation and LHC orientation antennas as described herein.

In one embodiment, the mesh network device 400 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 400 may be based on CSMA-CA, not TDMA. Deciding where the data will be coming into the mesh network device 400 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 400 can adapt a beam patter to be essentially fixed since the mesh network devices are not intended to move once situated.

Figure 5:
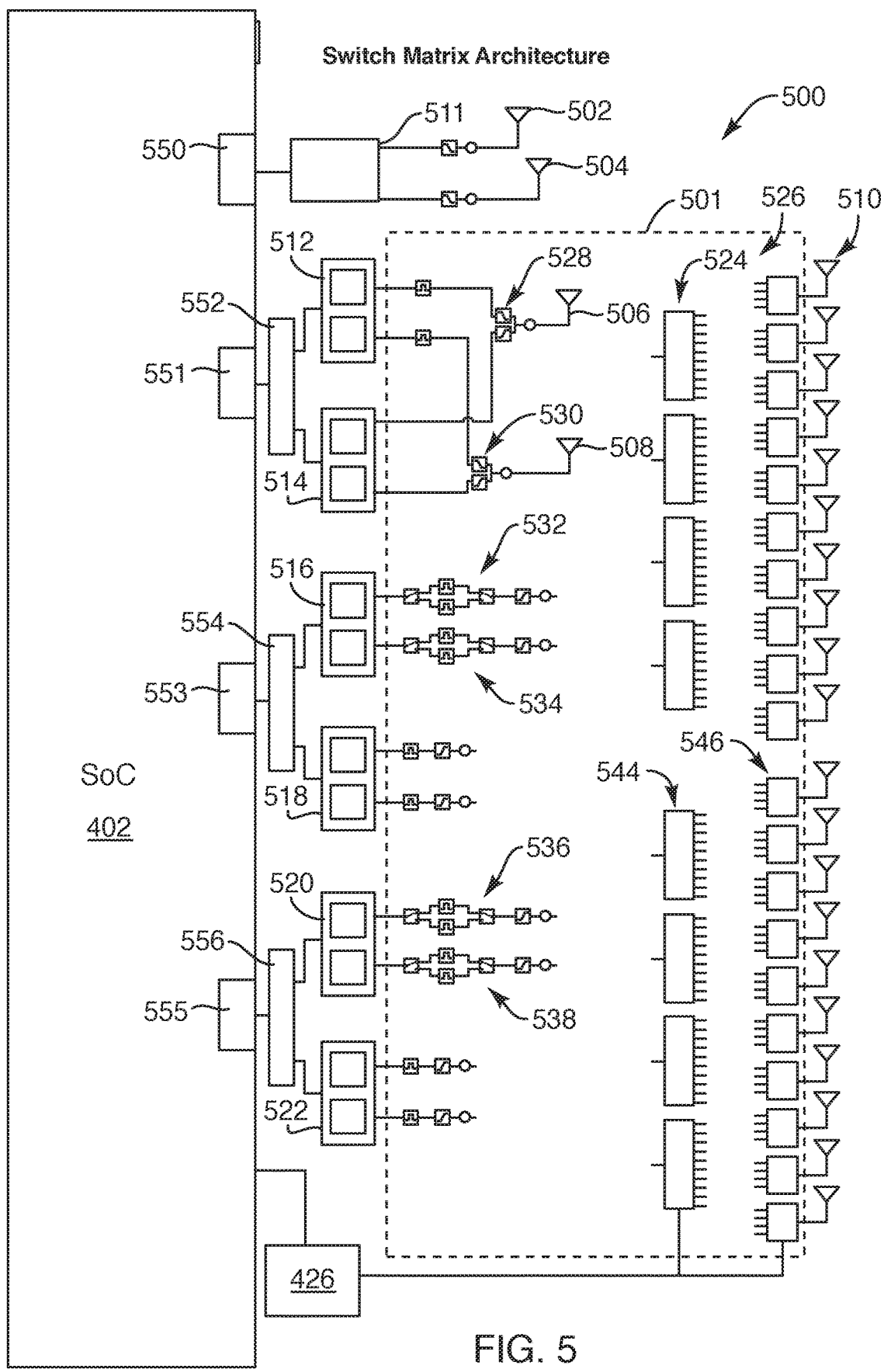
FIG. 5 is a block diagram of antenna switching circuitry of a network hardware device according to one embodiment.
Figure 6:
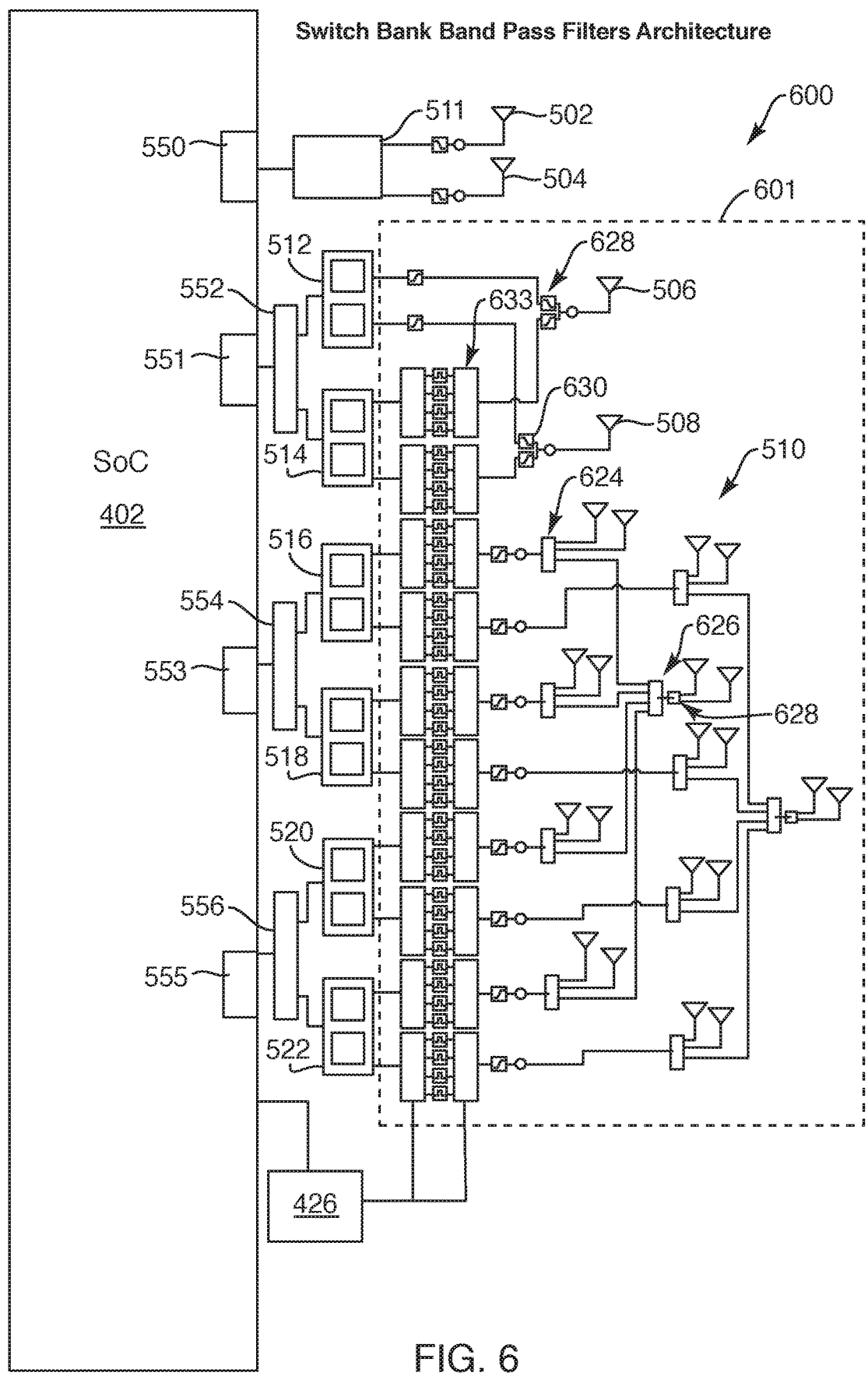
FIG. 6 is a block diagram of antenna switching circuitry of a network hardware device according to another embodiment.
Figure 7:
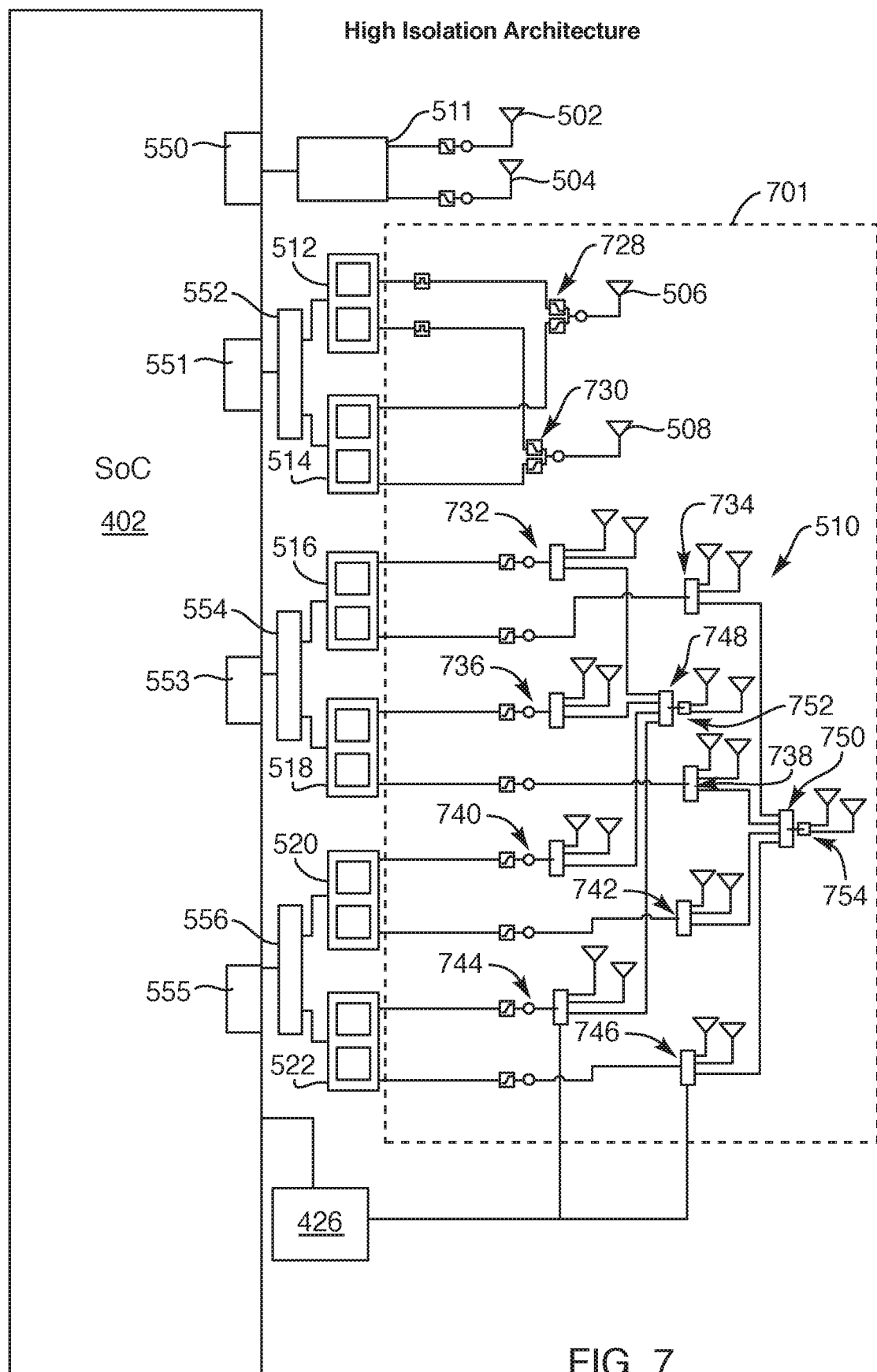
FIG. 7 is a block diagram of antenna switching circuitry of a network hardware device according to another embodiment.

In one embodiment, the antenna switching circuitry 424 includes multiple diplexers and switches to connect different combinations of antennas to the multiple radios. FIGS. 5-7 illustrate three different architectures for the antenna switching circuitry 424. The following diagrams use the following notations for reference:

ANT Hx→Horizontal orientation device side antenna
ANT Vx→Vertical orientation device side antenna
ANT VB→Vertical orientation device bottom side antenna
ANT HB→Horizontal orientation device bottom side antenna
ANT VU→Vertical orientation device top side antenna
ANT HU→Horizontal orientation device top side antenna
ANT0→Omni directional antenna
ANT1→Omni directional antenna One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omni-directional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 400.

FIG. 5 is a block diagram of antenna switching circuitry 501 of a network hardware device 500 according to one embodiment. The network hardware device 500 includes the SoC 402 as described above. The SoC 402 includes a first interface 550 coupled to a first RF radio 511, a first PCIe interface 551 coupled to a first PCIe switch 552, a second PCIe interface 553 coupled to a second PCIe switch 554, and a third PCIe interface 555 coupled to a third PCIe switch 556. The first PCIe switch 552 is coupled to a first WLAN radio 512 and a second WLAN radio 514. The second PCIe switch 554 is coupled to a third WLAN radio 516 and a fourth WLAN radio 518. The third PCIe switch 556 is coupled to a fifth WLAN radio 520 and a sixth WLAN radio 522. Each of the PCIe switches 512-522 includes a first WLAN channel and a second WLAN channel coupled to terminals of the antenna switching circuitry 501. The first RF radio 511 is coupled to a first WAN antenna 502 over a first WAN channel and coupled to a second WAN antenna 504 over a second WAN channel. The antenna switching circuitry 501 is coupled to the various antennas 510. Although the depicted embodiment uses PCIe interfaces and PCIe switches, in other embodiments, other types of interfaces and switches can be used. The first WLAN radio 512 is a 2×2 2.4 GHz MIMO radio and the second WLAN radios 514-522 are 2×2 5 GHz MIMO radios. In other embodiments, the SoC 402 may include a same number of interfaces as a number of radios coupled to the SoC 402. In these cases, PCIe switches would not be needed. For example, in other embodiment, the SoC 402 includes 7 interfaces for the seven radios. When six radios are used, the SoC 402 may include six digital interfaces. Alternatively, other interconnects can be used to connect the radios to the SoC 402 or other type of application processor.

In the depicted embodiment, the antenna switching circuitry 501 includes: a first diplexer 528 coupled to a first antenna 506, a first channel of the first 2×2 2.4 GHz MIMO radio 512, and a first channel of the 2×2 5 GHz MIMO radio 514; a second diplexer 530 coupled to the second antenna 508, a second channel of the first 2×2 2.4 GHz MIMO radio 512, and a second channel of the 2×2 5 GHz MIMO radio 514; and a switch matrix. Although the first antenna 528 and the second antenna 530 are illustrated inside the antenna switching circuitry 501, these antennas are not part of the antenna switching circuitry 501. The micro controller 426 controls the switches of the switch matrix to select different combinations of the antennas to be coupled to the different radios, as described herein. The micro controller 426 can select the switches according to an antenna selection algorithm. The switch matrix includes: a first set 526 of ten single-pole, four-throw (SP4T) switches each coupled to one of the first, second, third, fourth, fifth, sixth, seventh, eighth, ninth, and tenth horizontal antennas; a second set 524 of four single-pole, ten-throw (SP10T) switches, each of the four terminals of each of the ten SP10T switches of the first set 526 is coupled to one of the ten terminals of the four SP10T switches of the second set 524; a third set 546 of ten SP4T switches each coupled to one of the first, second, third, fourth, fifth, sixth, seventh, eighth, ninth, and tenth vertical antennas; and a fourth set 544 of SP switches, each of the four terminals of each of the ten SP10T switches of the third set 546 is coupled to one of the ten terminals of the four SP10T switches of the fourth set 544.

In a further embodiment, the antenna switching circuitry 501 includes additional switches 532, 534, 536 and 538 to provide multiple paths with different band pass filters tuned to specific sub-ranges of frequencies within the frequency band. The antenna switching circuit 501 may include additional band pass filters that are tuned to specific sub-ranges of frequencies. These band pass filters may be statically disposed on the conductive path between the radios and the switches 524, 544. In other embodiment, as depicted, the antenna switching circuitry 501 includes low pass filters, high pass filters, band pass filters, or any combination thereof, in the communication paths between the radios and the antennas. For example, high pass filters are disposed on the communication paths between the first RF radio 511 and the first WAN antenna 502 and the second WAN antenna 504. The high pass filters can be used to filter out frequencies higher than a certain frequency, such as the 5 GHz frequency of the second WLAN radios 514-522 that are 2×2 5 GHz MIMO radios. Low pass filters can be used to filter out frequencies lower than a certain frequency, such as the 2.4 GHz frequencies of the first RF radio 511, or the frequencies of the first WLAN radio 512 that is a 2×2 2.4 GHz MIMO radio. Band pass filters can also be used to filter out unwanted frequencies outside of a range of frequencies for the particular communication channel.

Another configuration for the antenna switching circuitry 424 includes a switch bank of band pass filters (BPFs). In this architecture, there are six 2×2 WLAN radios in this architecture. Five radios are 5 GHz band and one radio is a 2.4 GHz radio. A switch band pass filters bank is implemented to provide channels selectivity in the WLAN 5 GHz band. Four of the 5 GHz radios may have a dedicated and fixed connection to the switch band pass filter bank. Each switch bank band pass filters element is connected to the antennas using a series of switches that allows the connection of the switch bank to any of the Vx/Hx antennas. The advantages of this architecture may be a reduction in complexity of the switching matrix and may give each radio the flexibility of choosing any WLAN channel based on the routing algorithms, instead of fixing each radio to a dedicated channel in the switching matrix architecture. One of the 5 GHz radios may have a fixed connection to any one of the omni-directional antennas (Ant0 and Ant1) through a switch bank filters. The 2.4 GHz antenna may have access to all the WLAN 2.4 GHz band channels. The architecture may also have a 4G/3G and 2G WAN radio (e.g., first RF radio 511) to provide cellular connectivity to the mesh network device.

FIG. 6 is a block diagram of antenna switching circuitry 601 of a network hardware device 600 according to another embodiment. The network hardware device 600 is similar to the network hardware device 500 as noted by similar reference labels. In the depicted embodiment, the antenna switching circuitry 601 includes: a first diplexer 628 coupled to the first antenna 506 and a first channel of the first 2×2 2.4 GHz MIMO radio 512; a second diplexer 630 coupled to the second antenna 508 and a second channel of the first 2×2 2.4 GHz MIMO radio 514; and a switch bank of band pass filters (BPFs). The micro controller 426 controls the switches of the switch bank to select different combinations of the antennas to be coupled to the different radios, as described herein. The micro controller 426 can select the switches according to an antenna selection algorithm. The switch bank includes: ten sets 631 of BPFs, each set having four BPFs; ten pairs 633 of –SP4T switches. Each of the ten sets 631 of four BPFs are coupled between each pair of the ten pairs 633 of SP4T switches. Each of the ten pairs 633 of SP4T switches is coupled to a channel of the second 2×2 5 GHz MIMO radio 516, the third 2×2 5 GHz MIMO radio 518, the fourth 2×2 5 GHz MIMO radio 520, or the fifth 2×2 5 GHz MIMO radio 522. A first of the ten pairs 633 of SP4T switches is coupled to a first channel of the first 2×2 5 GHz MIMO radio 522 and the first diplexer 528. A second of the ten pairs 633 of SP4T switches is coupled to a second channel of the first 2×2 5 GHz MIMO radio 522 and the second diplexer 630. A first SP4T switch is coupled to a third of the ten pairs 633 of SP4T switches, the first horizontal antenna, and the second horizontal antenna. A second SP4T switch is coupled to a fourth of the ten pairs 633 of SP4T switches, the first vertical antenna, and the second vertical antenna. A third SP4T switch is coupled to a fifth of the ten pairs 633 of SP4T switches, the third horizontal antenna, and the fourth horizontal antenna. A fourth SP4T switch is coupled to a sixth of the ten pairs 633 of SP4T switches, the third vertical antenna, and fourth second vertical antenna. A fifth SP4T switch is coupled to a seventh of the ten pairs 633 of SP4T switches, the fifth horizontal antenna, and the sixth horizontal antenna. A sixth SP4T switch is coupled to an eighth of the ten pairs 633 of SP4T switches, the fifth vertical antenna, and sixth second vertical antenna. A seventh SP4T switch is coupled to a ninth of the ten pairs 633 of SP4T switches, the seventh horizontal antenna, and the eighth horizontal antenna. A eighth SP4T switch is coupled to a tenth of the ten pairs 633 of SP4T switches, the seventh vertical antenna, and eighth second vertical antenna. A ninth SP4T switch is coupled to the first SP4T switch, the third SP4T switch, the fifth SP4T switch, the seventh SP4T switch, and the ninth horizontal antenna or the ninth vertical antenna. A tenth SP4T switch is coupled to the second SP4T switch, the fourth SP4T switch, the sixth SP4T switch, the eighth SP4T switch, and the tenth horizontal antenna or the tenth vertical antenna. In other embodiments, the last four antennas are not horizontal and vertical antennas, but can be other polarization types, such as right hand circular (RHC) polarization and left hand circular (LHC) polarization.

Another configuration for the antenna switching circuitry 424 is a high isolation architecture. In this architecture, there are six 2×2 WLAN radios. Five radios are 5 GHz band radios and one radio is a 2.4 GHz radio. This architecture provides high isolation between the radios antennas. This may remove the need of filters or switched filter bank from the circuit board design to provide high isolation. In this architecture, each radio can be connected to any Vx/Hx antennas using a series of switches that are controlled by the routing algorithm. Based on the switches configuration and based on the routing algorithms input, each 2×2 radio may connect to a specific antenna pair in a specific direction. Each 2×2 radio may operate using a dedicated and unique WLAN frequency channel concurrently or simultaneously. In this architecture, two of the radios (5 GHz radio and 2.4 GHz radio) may have fixed connections to the omni-directional antennas (Ant0 and Ant1). These two radios may have access to all the WLAN 2.4 GHz and 5 GHz band channels. This architecture may also have a 4G/3G and 2G WAN radio (e.g., first RF radio 511) to provide cellular connectivity to the mesh network device.

FIG. 7 is a block diagram of antenna switching circuitry 701 of a network hardware device 700 according to another embodiment. The network hardware device 700 is similar to the network hardware device 500 as noted by similar reference labels. In the depicted embodiment, the antenna switching circuitry 701 includes: a first diplexer 728 coupled to a first antenna 506, a first channel of the first 2×2 2.4 GHz MIMO radio 512, and a first channel of the first 2×2 5 GHz MIMO radio 512; a second diplexer 630 coupled to a second antenna 508, a second channel of the first 2×2 2.4 GHz MIMO radio 514, and a second channel of the first 2×2 5 GHz MIMO radio 514; a first single-pole, multiple-throw (SPnT) switch 724 coupled to a first channel of the second 2×2 5 GHz MIMO radio 516, the first horizontal antenna, and the second horizontal antenna, where N is an integer value greater than two; a second SPnT switch 734 coupled to a second channel of the second 2×2 5 GHz MIMO radio 516, the first vertical antenna, and the second vertical antenna; a third SPnT switch 736 coupled to a first channel of the third 2×2 5 GHz MIMO radio 518, the third horizontal antenna, and the fourth horizontal antenna; a fourth SPnT switch 738 coupled to a second channel of the third 2×2 5 GHz MIMO radio 518, the third vertical antenna, and fourth second vertical antenna; a fifth SPnT switch 740 coupled to a first channel of the fourth 2×2 5 GHz MIMO radio 520, the fifth horizontal antenna, and the sixth horizontal antenna; a sixth SPnT switch 742 coupled to a second channel of the fourth 2×2 5 GHz MIMO radio 520, the fifth vertical antenna, and sixth second vertical antenna; a seventh SPnT switch 744 coupled to a first channel of the fifth 2×2 5 GHz MIMO radio 522, the seventh horizontal antenna, and the eighth horizontal antenna; an eighth SPnT switch 746 coupled to a second channel of the fifth 2×2 5 GHz MIMO radio 522, the seventh vertical antenna, and eighth second vertical antenna; a first SPDT switch 752 coupled to the ninth antenna and the tenth antenna; a ninth SPnT switch 748 coupled to the first SPDT switch 732, the first SPnT switch 752, the third SPnT switch 736, the fifth SPnT switch 740, and the seventh SPnT switch 744; a second SPDT switch 754 coupled to the eleventh antenna and the twelfth antenna; and a tenth SPnT switch 750 coupled to the second SPDT switch 734, the second SPnT switch 754, the fourth SPnT switch 738, the sixth SPnT switch 742, and the eighth SPnT switch 746. The n is an integer value greater than two. The micro controller 426 controls the switches 732-746 to select different combinations of the antennas to be coupled to the different radios, as described herein. The micro controller 426 can select the switches according to an antenna selection algorithm.

In another embodiment, a mesh network device includes an application processor, a micro controller, and antenna switching circuitry. The application processor processes data signals in connection with communicating with other mesh network devices and client consumption devices in a WMN. The mesh network device also includes seven radios: a first radio coupled to a first interface of the application processor and coupled to two cellular antennas; a second radio coupled to a second interface of the application processor, the second radio being coupled to a first dual-band omni-directional antenna; a third radio coupled to the second interface, the third radio being coupled to a second dual-band omni-directional antenna; a fourth radio coupled to a third interface of the application processor; a fifth radio coupled to the third interface; a sixth radio coupled to a fourth interface of the application processor; and a seventh radio coupled to the fourth interface. The antenna switching circuitry includes a first set of four switches (e.g., 732, 736, 740, 744), each of the four switches in the first set being coupled to a first channel of the fourth, fifth, sixth, and seventh radios, respectively, and to one pair of a first set of four pairs of directional antennas, respectively. The antenna switching circuitry also includes a second set of four switches (e.g., 734, 738, 742, 746), each of the four switches of the second set being coupled to a second channel of the fourth, fifth, sixth, and seventh radios, respectively, and to one pair of a second set of four pairs of directional antennas, respectively. The antenna switching circuitry also includes a third switch (e.g., 748) coupled to each of the first set of four switches and one of a third set of two directional antennas and a fourth switch (e.g., 750) coupled to each of the second set of four switches and one of a fourth set of two directional antennas. The micro controller controls the antenna switching circuitry to connect different combinations of the first set, the second set, the third set, and the fourth set of directional antennas to different combinations of the fourth, fifth, sixth, and seventh radios for wireless communications between the mesh network device and the other mesh network devices in the WMN. In another embodiment, micro controller controls the antenna switching circuitry to couple any of the directional antennas to any of the fourth radio, the fifth radio, the sixth radio, or the seventh radio. In a further embodiment, the antenna switching circuitry may include a fifth switch (e.g., 752) coupled between the third switch and the third set of two directional antennas and a sixth switch (e.g., 754) coupled between the fourth switch and the fourth set of two directional antennas.

In a further embodiment, the fourth, fifth, sixth, and seventh radios are WLAN radios that operate at the 5 GHz band, the second radio is a WLAN radio that operates at the 2.4 GHz band, and the third radio is a WLAN radio that operates at the 5 GHz band. The first radio can operate at one or more cellular frequency bands as described herein.

In a further embodiment, the antenna switching circuitry may include a first diplexer (e.g., 728) coupled to the first dual-band omni-directional antenna, a first channel of the second radio, and a first channel of the third radio. The antenna switching circuitry may also include a second diplexer (e.g., 730) coupled to the second dual-band omni-directional antenna, a second channel of the second radio, and a second channel of the third radio.

In a further embodiment, the mesh network device includes three interconnect switches: a first interconnect switch (e.g., PCIe switch) coupled the second interface of the application processor and coupled to the second radio and the third radio; a second interconnect switch (e.g., PCIe switch) coupled the third interface of the application processor and coupled to the fourth radio and the fifth radio; and a third interconnect switch (e.g., PCIe switch) coupled the fourth interface of the application processor and coupled to the sixth radio and the seventh radio.

Figure 8:
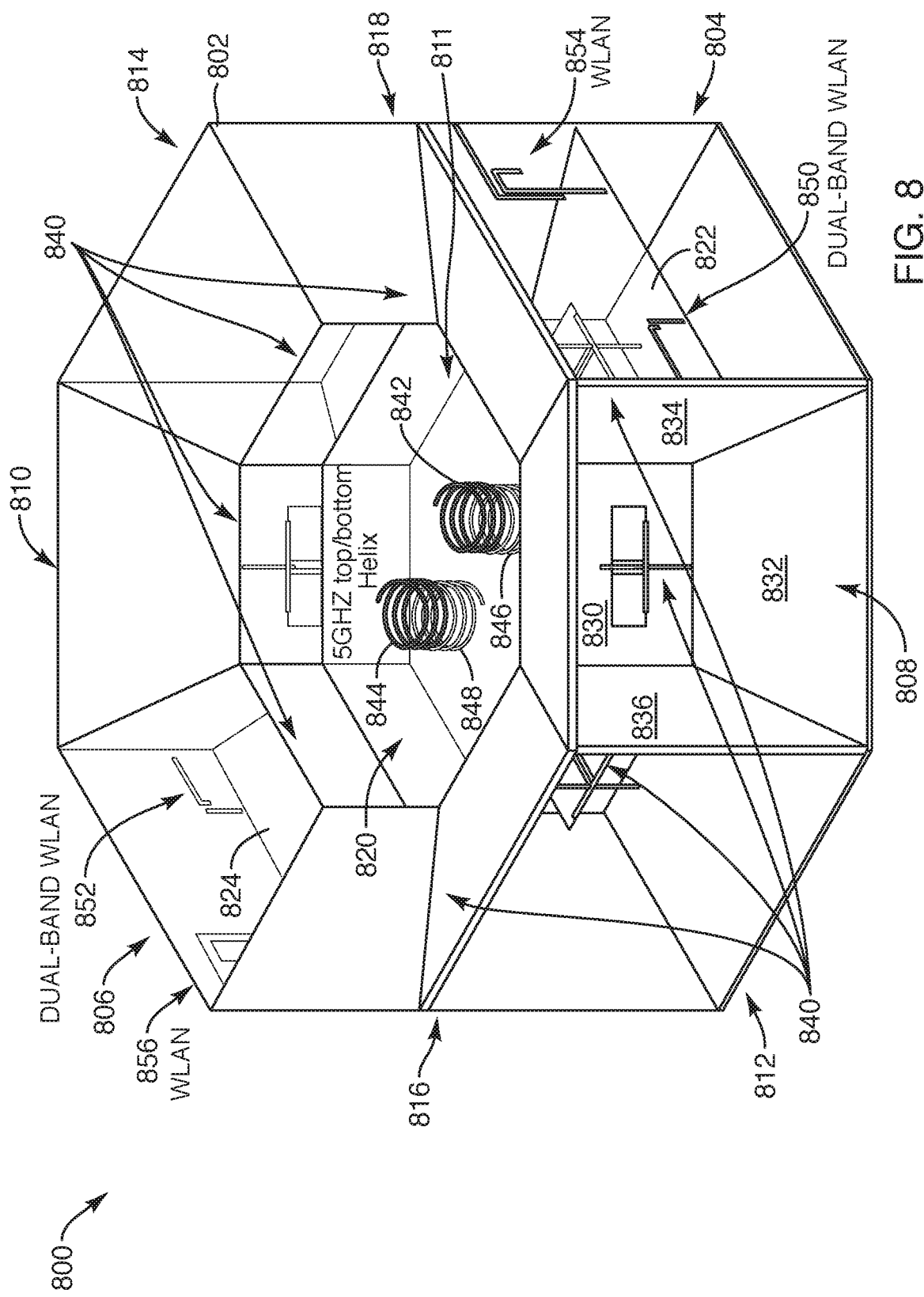
FIG. 8 illustrates a multi-radio, multi-channel (MRMC) network device according to one embodiment.

FIG. 8 illustrates a multi-radio, multi-channel (MRMC) network device 800 according to one embodiment. The MRMC network 800 includes a metal housing 802 that has eight sectors 804-818. Each of the eight sectors 804-818 has a truncated pyramid structure with a top portion and four side portions that define a recessed region of the respective truncated pyramid structure. The truncated pyramid structures are disposed on their sides in a horizontal plane and arranged in a circular arraignment with two adjacent sectors sharing at least one common side portion. The truncated pyramid structure may form an octagonal prism for the metal housing 802. The top portion and the four side portions may be metal surfaces or have portions of metal. Also, the outer top surfaces of the eight sectors form an inner chamber 811 in a center of the metal housing 802. In particular, the sector 808 may be considered a reflective chamber that includes an top portion 830, a first side portion 832, a second side portion 834, a third side portion 836, and a fourth side portion 838. The other sectors 804, 806, 810, 812, 814, 816, and 818 may have similar metal portions or surfaces as reflective chambers as the sector 808. Similarly, the inner chamber 811 can be considered reflective. For example, the circuit board 811 includes a metal ground plane that is a reflective surface for the top antenna, as well as for the bottom antenna. The opposite sides of the metal surfaces of the reflective chambers also are reflective for the top and bottom antennas.

In the depicted embodiment, the MRMC network 800 includes a circuit board 820 disposed within the metal housing 802. In particular, the circuit board 820 may include multiple portions, such as a first portion disposed in the inner chamber 811. There may be a second portion of the circuit board 820 disposed within a first sector 804 and a third portion of the circuit board 820 disposed within a second sector 806. These portions may extend to an outer side of the metal housing 802. The circuit board 820 may also include smaller portions that are disposed in the other sectors 808-818 to accommodate some of the antenna pairs disposed within the respective sectors.

In the depicted embodiment, the MRMC network 800 includes eight pairs of antennas 840, each pair being disposed in one of the eight sectors 804-818. Each pair includes a horizontal orientation antenna and a vertical orientation antenna. The eight pairs of antennas 840 may be disposed on, above, or below corresponding sections of the circuit board 820. In one embodiment, each of the eight pairs of antennas 840 is a pair of cross polarized dipole antennas, a pair of vertical polarized dipole antennas, or a pair of cross polarized patch antennas, as described below with respect to FIGS. 9-11.

In some embodiments, the MRMC network 800 includes a top antenna disposed on a top side of the circuit board 820 within the inner chamber 811 and a bottom antenna disposed on a bottom side of the circuit board 820 within the inner chamber 811. In the depicted embodiment, top antennas 842, 844 are disposed above the circuit board 820, and bottom antennas 846, 848 are disposed below the circuit board 820. The top antennas 842, 844 and the bottom antennas 846, 848 are helix coil antennas. In other embodiments, the top and bottom antennas may be other types of antennas, such as patch antennas, monopoles, dipoles, loops, folded monopoles, or the like.

In the depicted embodiment, the eight pairs of antennas 840, the top antennas 842, 844, and the bottom antennas 846, 848 are design to radiate electromagnetic energy in a first frequency range, such as the 5 GHz band of the Wi-Fi® technologies. The metal of the top portion and the four side portions of each of the eight sectors operate as a reflector chamber. For example, the metal of the top portion 830 and the four side portions 832-838 of the sector 808 operate as a reflector chamber for the pair of antennas 840 within the respective chamber. The reflective chamber reflects the electromagnetic energy, radiated by the horizontal orientation antenna, in a first directional radiation pattern with high gain in a direction along a center axis of the sector 808 (e.g., a truncated pyramid structure) and reflects the electromagnetic energy, radiated by the vertical orientation antenna, in a second directional radiation pattern with high gain in the direction along the center axis of the sector 808. The gain the first direction is considered higher than the gain in other directions, such as an opposite direction than the first direction. The number of metal surfaces may impact the gain in the first direction. As few as one metal surface can be used to reflect the electromagnetic energy. However, if more than three metal surfaces, the gain in the first direction can be increased.

In the depicted embodiment, the MRMC network 800 includes a first omni-directional antenna 850 (e.g., dual-band WLAN antenna) disposed on the top side of the second portion of the circuit board 820 disposed within the sector 804 (i.e., a first of the eight sectors). In a further embodiment, a second omni-directional antenna 852 is disposed on the top side of the third portion of the circuit board 820 disposed within the sector 806 (i.e., a second of the eight sectors). The first omni-directional antenna 850 and the second omni-directional antenna 852 are designed to radiate electromagnetic energy in the first frequency range (e.g., 5 GHz band) and a second frequency range (e.g., 2.4 GHz band).

In the depicted embodiment, the MRMC network 800 includes a first cellular antenna 854 (e.g., WWAN antenna) disposed on the top side of the second portion of the circuit board 820 disposed within the sector 804 (i.e., a first of the eight sectors). In a further embodiment, a second cellular antenna 856 is disposed on the top side of the third portion of the circuit board 820 disposed within the sector 806 (i.e., a second of the eight sectors). The first cellular antenna 854 and the second cellular antenna 856 are designed to radiate electromagnetic energy in a third frequency range. For examples, the third frequency range may be the 900 MHz band for the 2G specification, the 1800 MHz band for the 2G specification, the B1 band for the 3G specification, the B8 band for the 3G specification, or the B40 band for the LTE specification.

In the depicted embodiment, the MRMC network 800 includes a first RF radio (not illustrated in FIG. 8) disposed on the circuit board 820 and coupled to the first cellular antenna 854 and the second cellular antenna 856. The first RF radio causes the first cellular antenna 854, the second cellular antenna 856, or both to radiate the electromagnetic energy in the third frequency range. In a further embodiment, multiple RF radios (not illustrated in FIG. 8) are disposed on the circuit board 820 and coupled to the eight pairs of antennas 840, the top antennas 842, 844, and the bottom antennas 846, 848. The RF radios cause different combinations of one or more of the eight pairs of antennas 840, the top antennas 842, 844, and the bottom antennas 846, 848 to radiate the electromagnetic energy in the first frequency range (e.g., 2.4 GHz band). In a further embodiment, a second RF radio (not illustrated in FIG. 8) is disposed on the circuit board 820 and coupled to the first omni-directional antenna 850 and the second omni-directional antenna 852. The second RF radio cause the first omni-directional antenna 850, the second omni-directional antenna 852, or both to radiate the electromagnetic energy in the first frequency range (e.g., 5 GHz band).

In the depicted embodiment, the MRMC network 800 includes a third RF radio (not illustrated in FIG. 8) disposed on the circuit board 820 and coupled to the first omni-directional antenna 850 and the second omni-directional antenna 852. The second RF radio cause the first omni-directional antenna 850, the second omni-directional antenna 852, or both to radiate the electromagnetic energy in the second frequency range (e.g., 2.4 GHz band).

Figure 9:
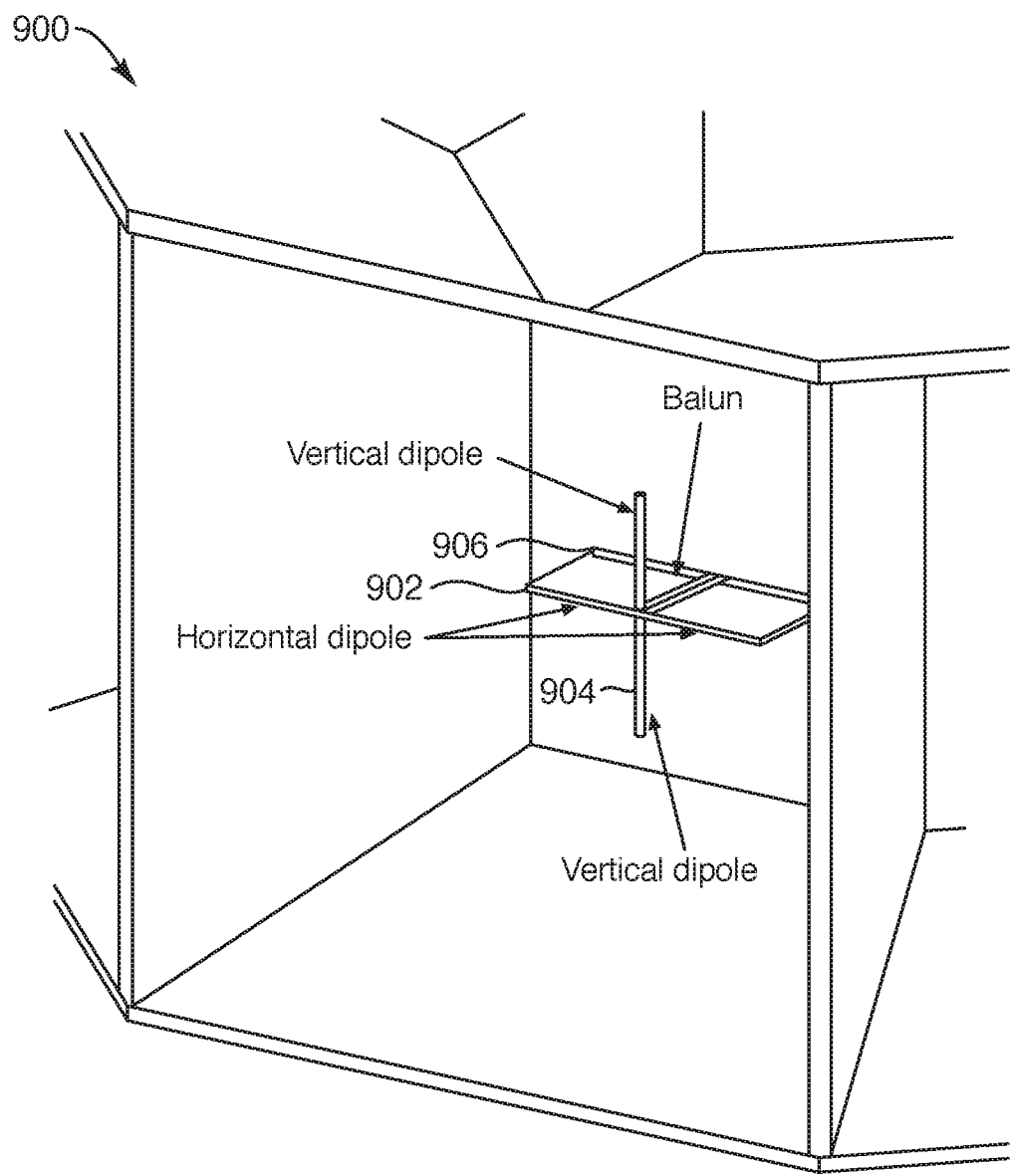
FIG. 9 illustrates a pair of cross polarized dipole antennas within a chamber of the MRMC network device of FIG. 8 according to one embodiment.

FIG. 9 illustrates a pair of cross polarized dipole antennas 902, 904 within a chamber 900 of the MRMC network device of FIG. 8 according to one embodiment. The pair of polarized dipole antennas includes a vertical orientation dipole antenna 902 and a horizontal orientation dipole antenna 904. Within the chamber 900, there may be a section 906 of the circuit board 820 upon which there are RF feeds disposed to feed the pair of cross polarized dipole antennas 902, 904. A balun 908 may be coupled to the pair of cross polarized dipole antennas 902, 904. A balun is an electrical device that converts between a balanced signal and an unbalanced signal. When current is applied to the vertical orientation dipole antenna 902, the vertical orientation dipole antenna 902 radiates electromagnetic energy in a vertical orientation. The chamber 900, being a reflective chamber as described above, reflects the electromagnetic energy, radiated by the vertical orientation dipole antenna 902, to form a first directional radiation pattern with high gain in a direction along a center axis of the chamber 900

(i.e., a truncated pyramid structure). When current is applied to the horizontal orientation dipole antenna 904, the horizontal orientation dipole antenna 904 radiates electromagnetic energy in a horizontal orientation. The chamber 900, being a reflective chamber as described above, reflects the electromagnetic energy, radiated by the horizontal orientation dipole antenna 904, to form a second directional radiation pattern with high gain in the direction along the center axis of the chamber 900 (i.e., a truncated pyramid structure). The other seven chambers, as illustrated in FIG. 8, may also include a pair of cross polarized dipole antennas 902, 904.

Figure 10:
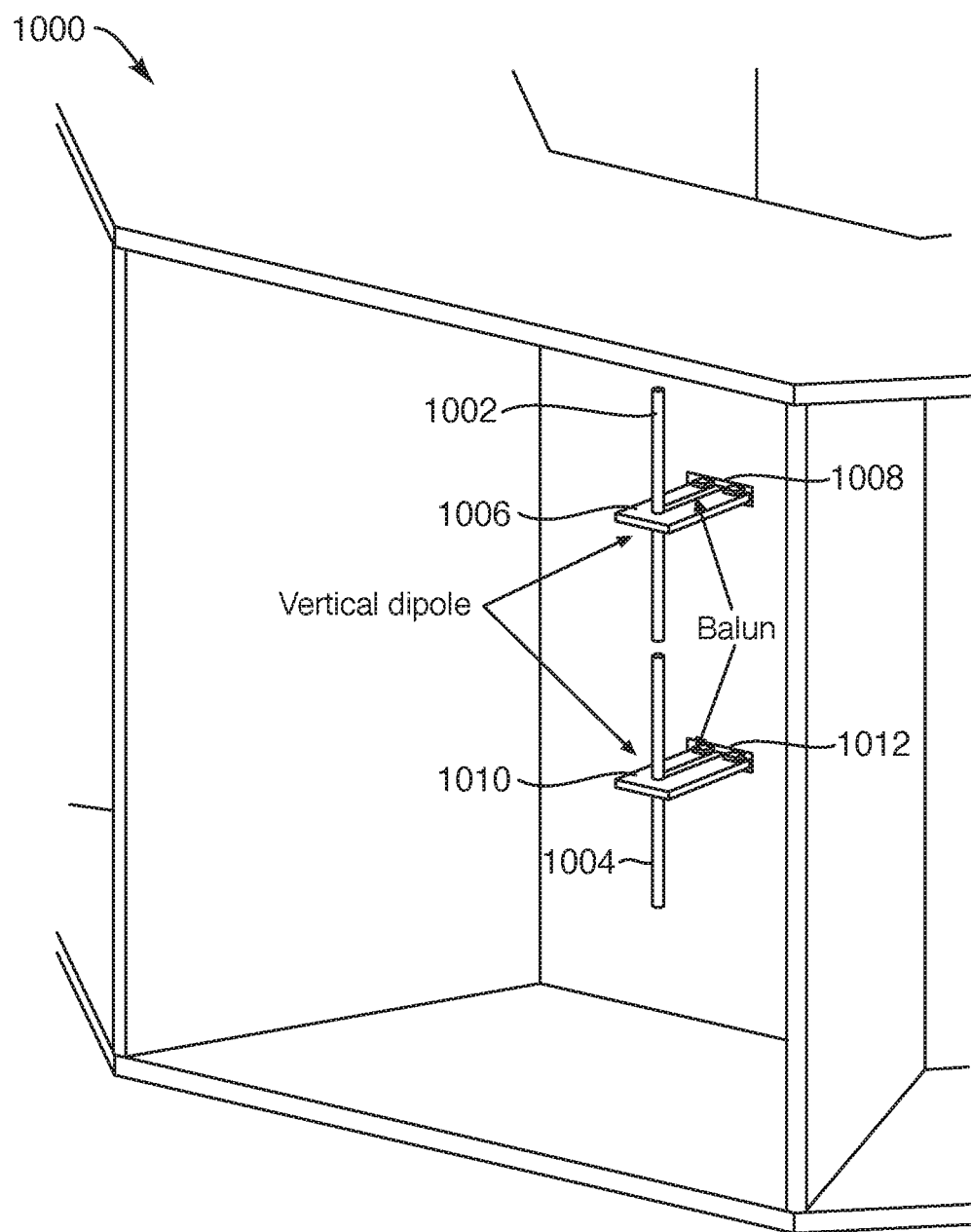
FIG. 10 illustrates a pair of vertical polarized dipole antennas within a chamber of the MRMC network device of FIG. 8 according to another embodiment.

FIG. 10 illustrates a pair of vertical polarized dipole antennas 1002, 1004 within a chamber 1000 of the MRMC network device of FIG. 8 according to another embodiment. The pair of vertical polarized dipole antennas includes a first vertical orientation dipole antenna 1002 and a second vertical orientation dipole antenna 1004. Within the chamber 1000, there may be a first section 1006 of the circuit board 820 upon an RF feed is disposed to feed the first vertical orientation dipole antennas 1002. A first balun 1008 may be coupled to the first vertical orientation dipole antennas 1002. Also, within the chamber 1000, there may be a second section 1010 of the circuit board 820 upon an RF feed is disposed to feed the second vertical polarized dipole antenna 1004. A second balun 1012 may be coupled to the second vertical dipole antennas 1004. When current is applied to the first vertical orientation dipole antenna 1002, the vertical orientation dipole antenna 1002 radiates electromagnetic energy in a vertical orientation. The chamber 1000, being a reflective chamber as described above, reflects the electromagnetic energy, radiated by the vertical orientation dipole antenna 1002, to form a first directional radiation pattern with high gain in a direction along a center axis of the chamber 1000. When current is applied to the second vertical orientation dipole antenna 1004, the second vertical orientation dipole antenna 1004 radiates electromagnetic energy in a vertical orientation. The chamber 1000, being a reflective chamber as described above, reflects the electromagnetic energy, radiated by the second orientation dipole antenna 1004, to form a second directional radiation pattern with high gain in the direction along the center axis of the chamber 1000 (i.e., a truncated pyramid structure). The other seven chambers, as illustrated in FIG. 8, may also include a pair of vertical polarized dipole antennas 1002, 1004. It should be noted that side portions may be slanted inward to an opposing side, such as illustrated in the reflective chamber 900 of FIG. 9. However, in other embodiments, some of the inner sides may not be slanted, but could be parallel to the opposing side, such as illustrated in the top and bottom surfaces of the reflective chamber 1000 of FIG. 10. In this embodiment, the two side portions are still slanted. Alternatively, other geometries of the walls can be used.

Figure 11:
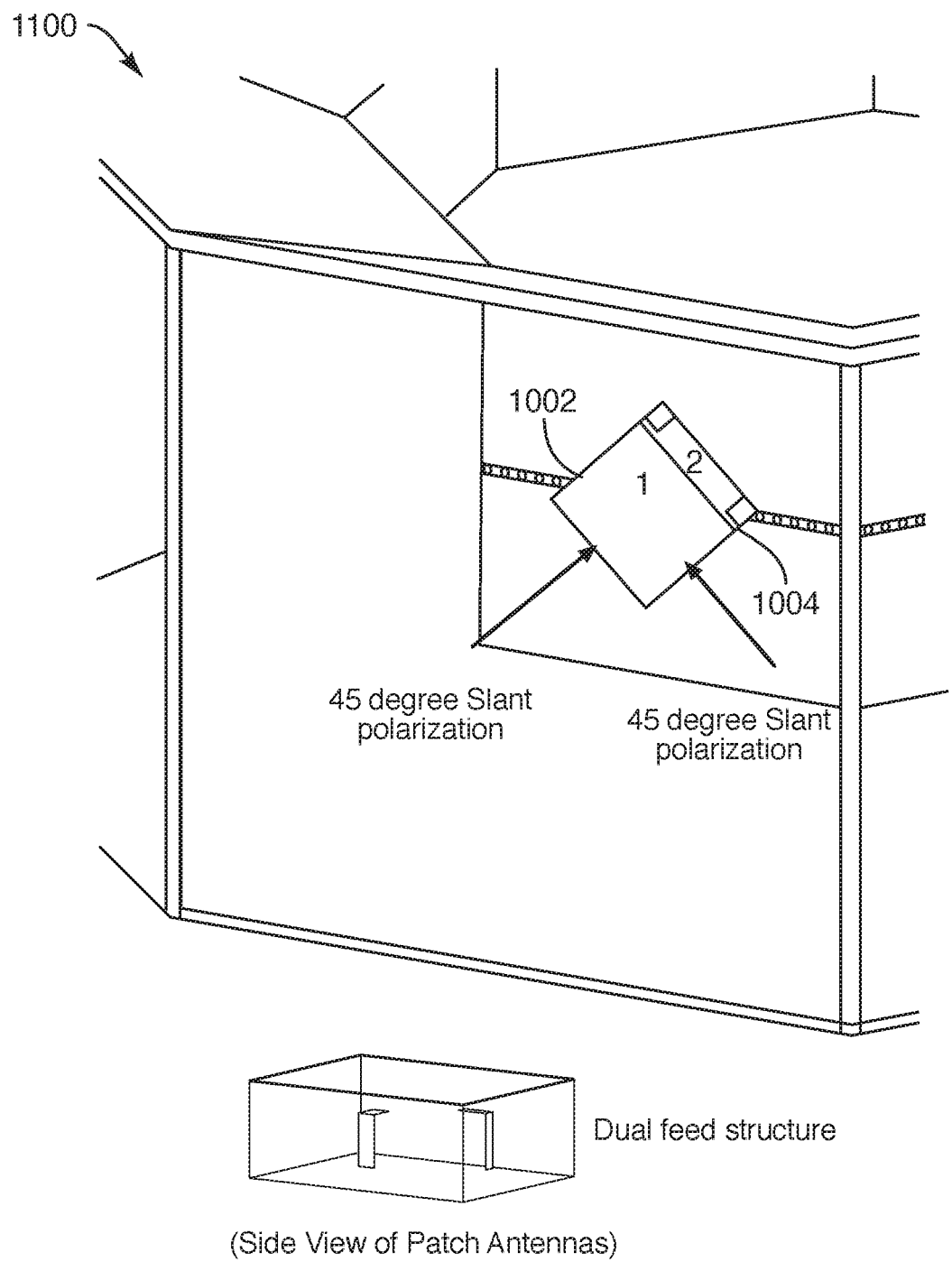
FIG. 11 illustrates a pair of cross polarized patch antennas within a chamber of the MRMC network device of FIG. 8 according to another embodiment.

FIG. 11 illustrates a pair of cross polarized patch antennas 1102, 1104 within a chamber of the MRMC network device of FIG. 8 according to another embodiment. The pair of cross polarized patch antennas includes a first orientation patch antenna 1102 and a second orientation patch antenna 1104. Within the chamber 1100, a first RF feed is disposed to feed a first side of a patch, forming a first orientation patch antenna 1102. Also, within the chamber 1100, a second RF feed is disposed to feed a second side of the path, forming a second orientation path antenna 1104. The first orientation patch antenna 1102 may be a first 45-degree slant polarization and the second orientation patch antenna 1104 may be a second 45-degree slant polarization that is orthogonal to the first 45-degree slant polarization. When current is applied to the first orientation patch antenna 1102, the first orientation patch antenna 1102 radiates electromagnetic energy in a first 45-degree orientation. The chamber 1100, being a reflective chamber as described above, reflects the electromagnetic energy, radiated by the first orientation patch antenna 1102, to form a first directional radiation pattern with high gain in a direction along a center axis of the chamber 10100. When current is applied to the second orientation patch antenna 1104, the second orientation patch antenna 1104 radiates electromagnetic energy in a second 45-degree orientation. The chamber 1100, being a reflective chamber as described above, reflects the electromagnetic energy, radiated by the second orientation patch antenna 1104, to form a second directional radiation pattern with high gain in the direction along the center axis of the chamber 1100 (i.e., a truncated pyramid structure). The other seven chambers, as illustrated in FIG. 8, may also include a pair of cross polarized patch antennas 1102, 1104.

Figure 12:
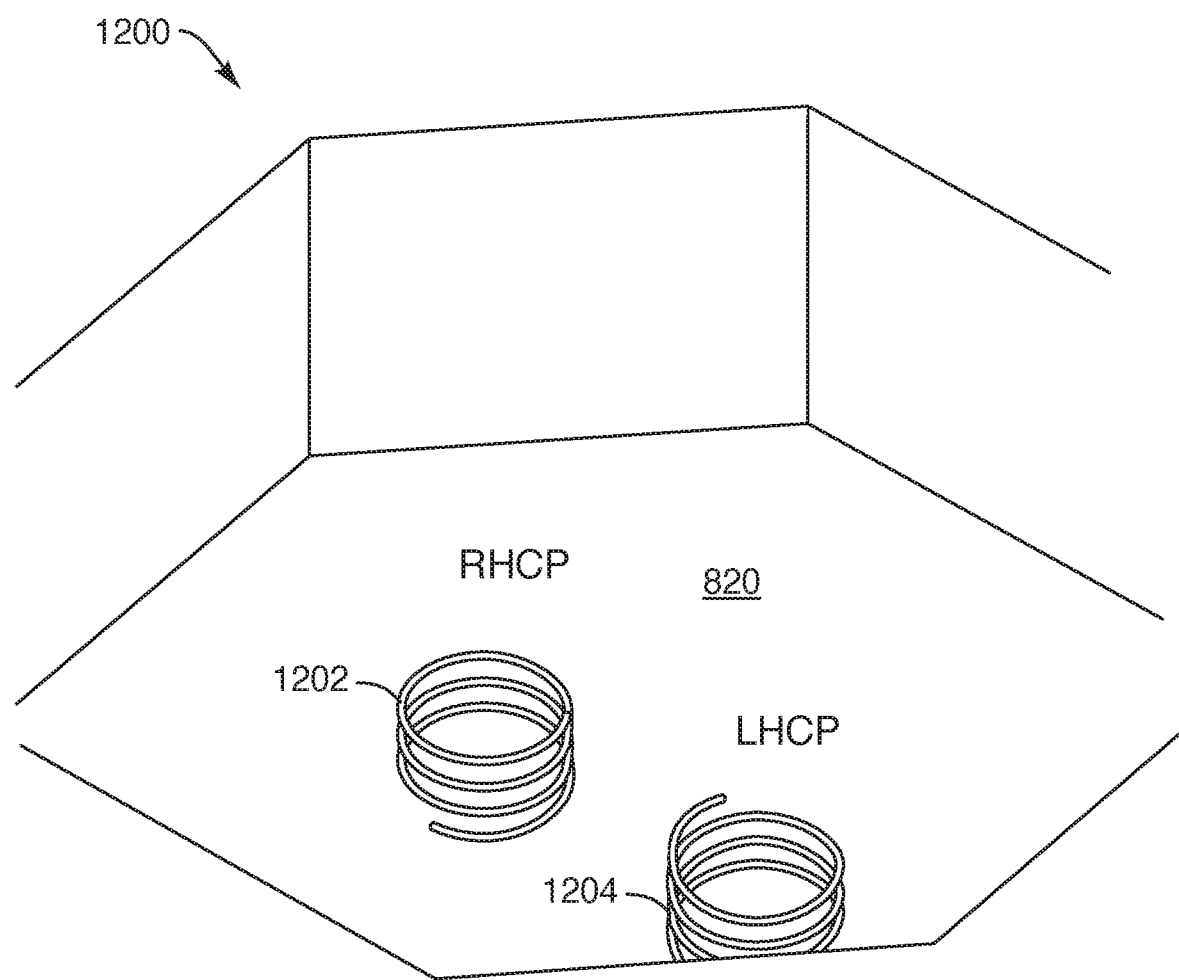
FIG. 12 illustrates a pair of coil antennas within an inner chamber of the MRMC network device of FIG. 8 according to one embodiment.

FIG. 12 illustrates a pair of coil antennas 1202, 1204 within an inner chamber 1200 of the MRMC network device of FIG. 8 according to one embodiment. The inner chamber 1200 is similar to the inner chamber 811 described above. In some embodiments, a portion of the inner chamber 1200 that is above the circuit board 820 may be considered an upper chamber, and the portion of the inner chamber 1200 that is below the circuit board 820 may be considered a lower chamber. In this upper chamber, the MRMC network device includes a first coil antenna 1202 having a right hand circular polarization (RHCP) and a second coil antenna 1204 having a left hand circular polarization (LHCP). A similar pair of antennas with RHCP and LHCP can be disposed on a second side of the circuit board 820 in the lower chamber. When current is applied to the first coil antenna 1202, the first coil antenna 1202 radiates electromagnetic energy in a RHCP. The chamber 1200 may or may not be reflective like the chambers in FIGS. 9-11. When the chamber 1200 is reflective, the electromagnetic energy, radiated by the first coil antenna 1202, forms a first directional radiation pattern with high gain in the direction along the center axis of the chamber 1200 (i.e., opening within an octagonal prism). When current is applied to the second coil antenna 1204, the second coil antenna 1204 radiates electromagnetic energy in a LHCP. When the chamber 1200 is reflective, the electromagnetic energy, radiated by the second coil antenna 1204, forms a second directional radiation pattern with high gain in the direction along the center axis of the chamber 1200 (i.e., opening within an octagonal prism). The lower chamber, as illustrated in FIG. 8, may also include a pair of coil antennas 1202, 1204.

Figure 13:
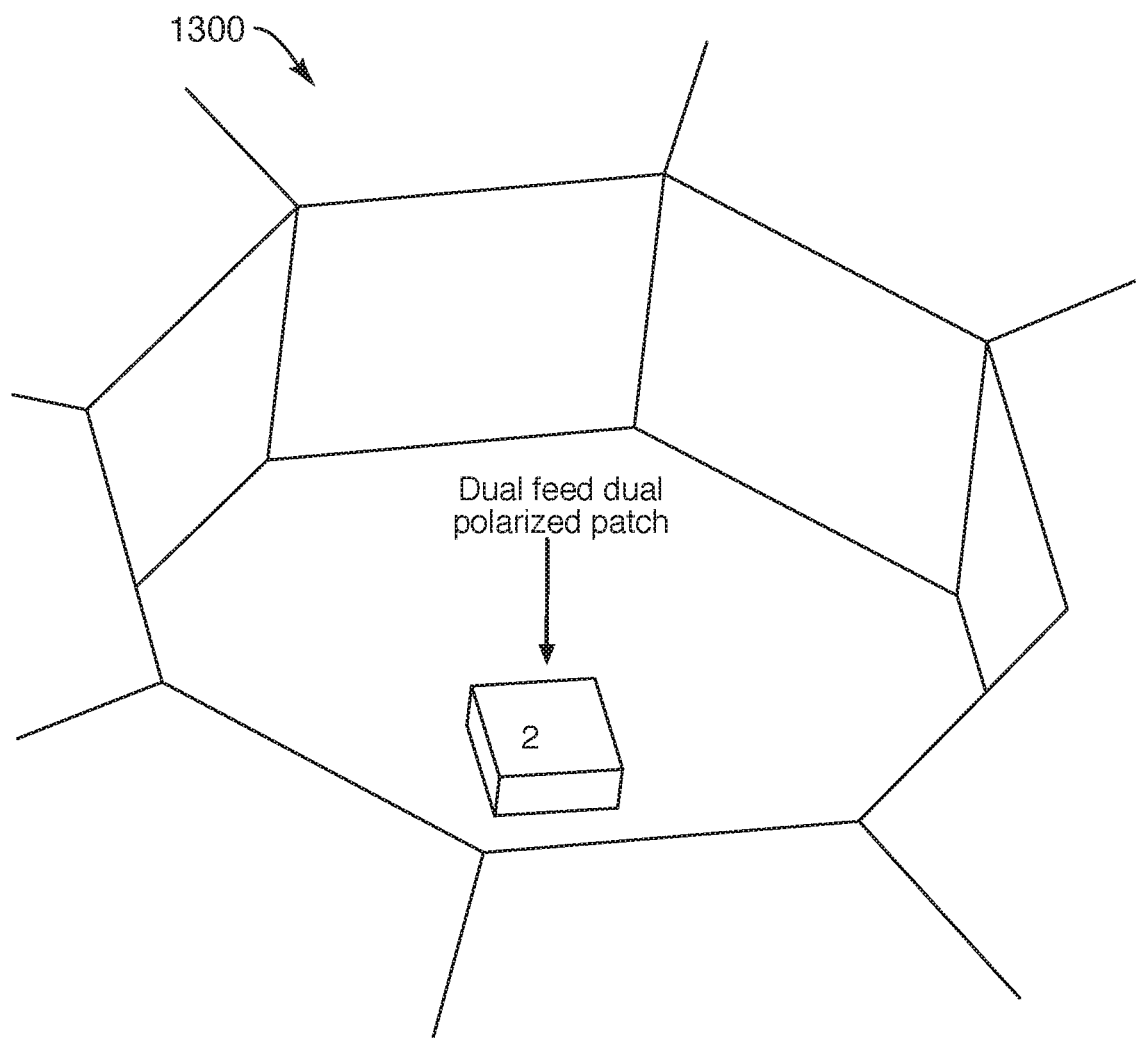
FIG. 13 illustrates a dual-feed, dual-polarized patch antenna within an inner chamber of the MRMC network device of FIG. 8 according to another embodiment.

FIG. 13 illustrates a dual-feed, dual-polarized patch antenna 1302 within an inner chamber 811 of the MRMC network device of FIG. 8 according to another embodiment. In this upper chamber, the MRMC network device includes dual-feed, dual-polarized patch antenna 1302. A similar dual-feed dual-polarized patch antenna can be disposed on a second side of the circuit board 820 in the lower chamber. When current is applied to a first feed of the dual-feed, dual-polarized patch 1302, the dual-feed, dual-polarized patch 1302 radiates electromagnetic energy in a first polarization. The chamber 1300 may or may not be reflective like the chambers in FIGS. 9-11. When the chamber 1300 is reflective, the electromagnetic energy, radiated by the dual-feed, dual-polarized patch 1302, forms a first directional radiation pattern with high gain in the direction along the center axis of the chamber 1300 (i.e., opening within an octagonal prism). When current is applied to a second feed of the dual-feed, dual-polarized patch 1302, the dual-feed, dual-polarized patch 1302 radiates electromagnetic energy in a second polarization. When the chamber 1300 is reflective, the electromagnetic energy, radiated by the dual-feed, dual-polarized patch 1302, forms a second directional radiation pattern with high gain in the direction along the center axis of the chamber 1300 (i.e., opening within an octagonal prism). The lower chamber, as illustrated in FIG. 8, may also include a dual-feed, dual-polarized patch 1302.

Figure 14A:
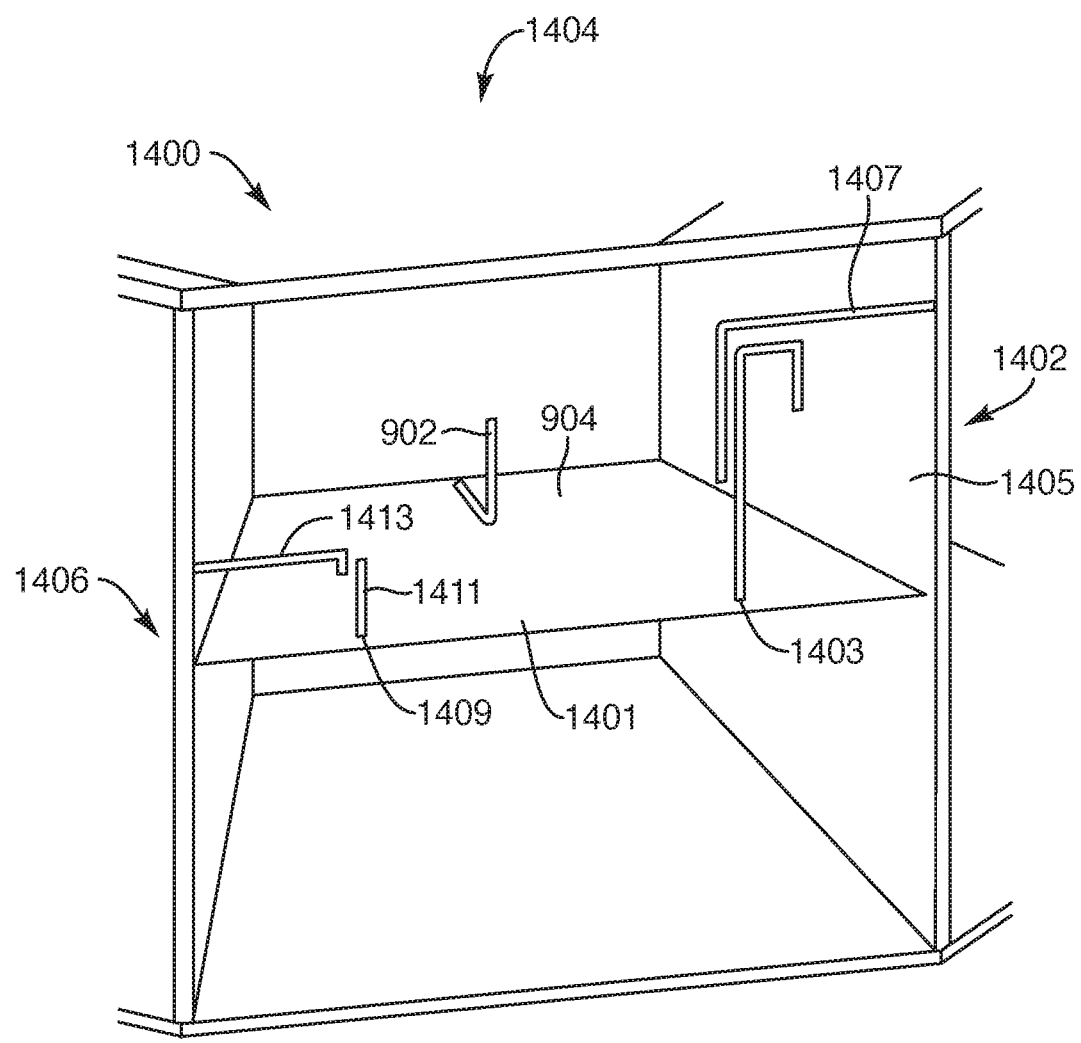
FIG. 14A illustrates a wide area network (WAN) antenna, a pair of cross polarized dipole antennas, and a dual-band WLAN antenna within a chamber of the MRMC network device of FIG. 8 according to one embodiment.

FIG. 14A illustrates a WAN antenna 1402, a pair of cross polarized dipole antennas 1404, and a dual-band WLAN antenna 1406 within a chamber 1400 of the MRMC network device of FIG. 8 according to one embodiment. Within the chamber 1400, a WAN antenna 1402 can be disposed on a section 1401 of the circuit board 820 of FIG. 8. A WAN feed 1403 is disposed on an outer edge of the section 1401 at the opening of the chamber 1400. The WAN feed 1403 is coupled to a monopole element 1405. A parasitic ground element 1407 is coupled to ground and parasitically coupled to the monopole element 1405. In this embodiment, the WAN antenna 1402, including the monopole element 1405 and the parasitic ground element 1407 are disposed above the section 1401 of the circuit board. In another embodiment, the WAN antenna 1402 can be disposed below on a second side of the circuit board. A similar WAN antenna can be disposed in a chamber on an opposite side, as illustrated in FIG. 8. In other embodiments, other WAN antennas can be disposed in other chambers of the MRMC network device. When current is applied to the WAN antenna 1402, the WAN antenna 1402 radiates electromagnetic energy. Because the WAN antenna 1402 is disposed on an outer edge of the section 1401 of the circuit board, the WAN antenna 1402 can be considered an omni-directional antenna. The WAN antenna 1402 can be designed to operate in WAN frequency bands, as described herein. In other embodiments, the WAN antenna 1402 can be other antenna types, such as a loop antenna, a yagi antenna, a monopole antenna, a PIFA antenna, or the like.

In the depicted embodiment, the chamber 1400 also includes the pair of cross polarized dipole antennas 1404, including the vertical orientation dipole antenna 902 and the horizontal orientation dipole antenna 904, such as described with respect to FIG. 9. In other embodiments, other types of directional antennas may be disposed in the locations of the antenna 1404, such as those illustrated and described with respect to FIGS. 10-11. In other embodiments, other types of antennas can be used as the directional antennas with different polarizations, such as helical coil antennas, loop antennas, yagi antennas, monopole antennas, PIFA antennas, or the like.

In the depicted embodiment, the chamber 1400 also includes a dual-band WLAN antenna 1406 disposed on the section 1401 of the circuit board 820 of FIG. 8. A WLAN feed 1409 is disposed on the outer edge of the section 1401 at the opening of the chamber 1400. The WLAN feed 1409 is coupled to a monopole element 1411. A parasitic ground element 1413 is coupled to ground and parasitically coupled to the monopole element 1411. In this embodiment, the WLAN antenna 1406, including the monopole element 1411 and the parasitic ground element 1413 are disposed above the section 1401 of the circuit board. In another embodiment, the WLAN antenna 1406 can be disposed below on a second side of the circuit board. A similar WLAN antenna can be disposed in a chamber on an opposite side, as illustrated in FIG. 8. In other embodiments, other dual-band WLAN antennas can be disposed in other chambers of the MRMC network device. For example, the dual-band WLAN antenna can be other types of antennas, such as helical coil antennas, loop antennas, yagi antennas, monopole antennas, PIFA antennas, or the like.

When current is applied to the WLAN antenna 1406, the WLAN antenna 1406 radiates electromagnetic energy. Because the WLAN antenna 1406 is disposed on an outer edge of the section 1401 of the circuit board, the WLAN antenna 1406 can be considered an omni-directional antenna. The WLAN antenna 1406 can be designed to operate in WLAN frequency bands, such as the 2.4 GHz band and the 5 GHz band as described herein.

Figure 14B:
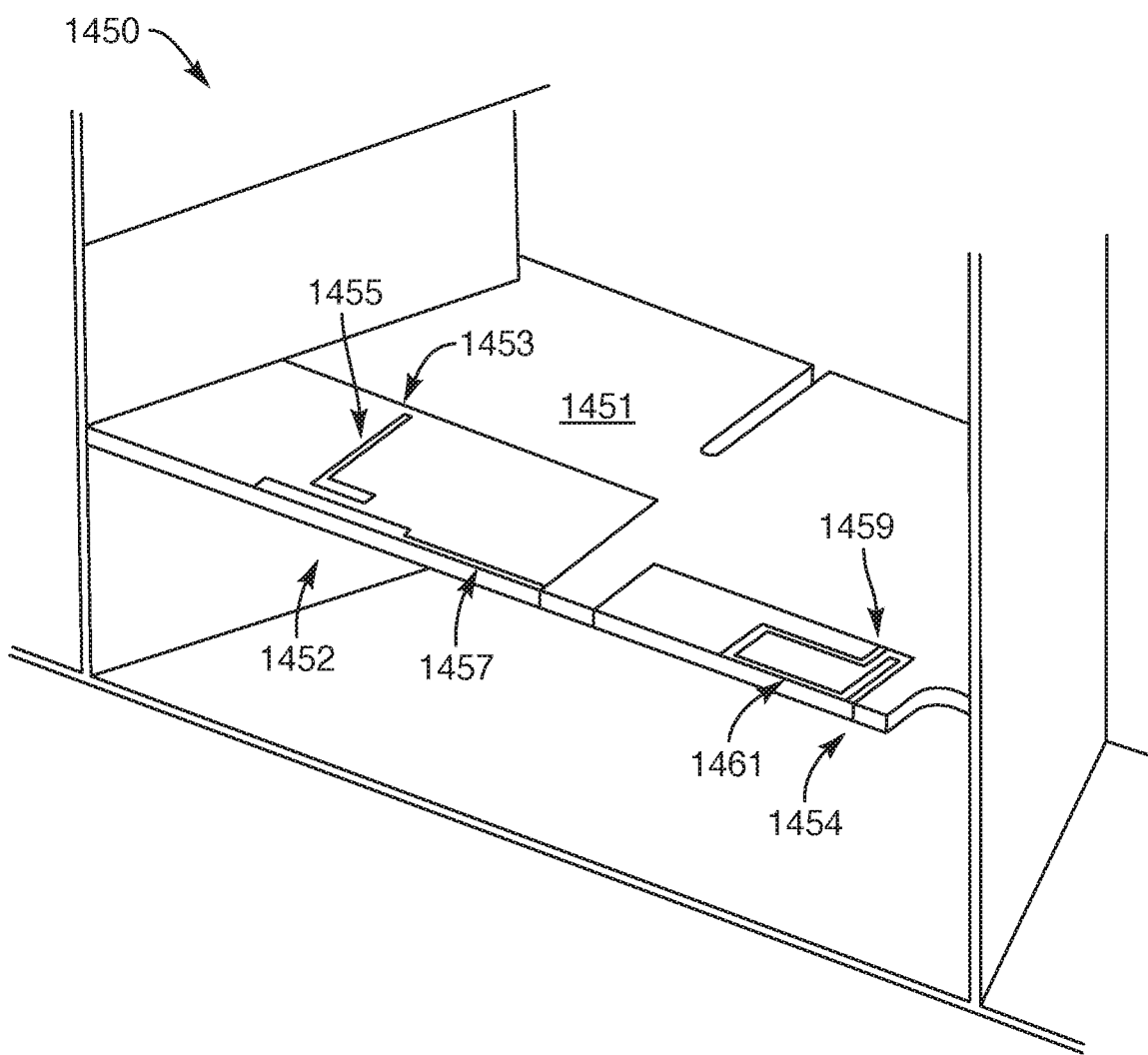
FIG. 14B illustrates a WAN antenna and a dual-band WLAN antenna within a chamber of the MRMC network device according to another embodiment.

FIG. 14B illustrates a WAN antenna 1452 and a dual-band WLAN antenna 1454 within a chamber 1450 of a MRMC network device according to another embodiment. Within the chamber 1450, a WAN antenna 1452 can be disposed on a section 1451 of the circuit board 820 of FIG. 8. A WAN feed 1453 is disposed on an edge of the section 1451. The WAN feed 1453 is coupled to a monopole element 1455. A parasitic ground element 1457 is coupled to ground at another edge of the section 4151 at a recessed region of the chamber 1450. The parasitic ground element 1457 is parasitically coupled to the monopole element 1455. In this embodiment, the WAN antenna 1452, including the monopole element 1455 and the parasitic ground element 1457 are disposed above the section 1451 of the circuit board. In another embodiment, the WAN antenna 1452 can be disposed below on a second side of the circuit board. A similar WAN antenna can be disposed in a chamber on an opposite side, as illustrated in FIG. 8. In other embodiments, other WAN antennas can be disposed in other chambers of the MRMC network device. When current is applied to the WAN antenna 1452, the WAN antenna 1452 radiates electromagnetic energy. Because the WAN antenna 1452 is disposed closer to the opening of the chamber 1450, the WAN antenna 1452 can be considered an omni-directional antenna. The WAN antenna 1452 can be designed to operate in WAN frequency bands, as described herein. In other embodiments, the WAN antenna 1452 can be other antenna types, such as a loop antenna, a yagi antenna, a monopole antenna, a PIFA antenna, or the like.

In the depicted embodiment, the chamber 1450 also includes a dual-band WLAN antenna 1454 disposed on the section 1451 of the circuit board 820 of FIG. 8. A WLAN feed 1459 is disposed on an edge of the section 1451. The WLAN feed 1459 is coupled to a monopole element 1461. In some embodiments, a folded monopole element or a loop element can be used instead. In this embodiment, the WLAN antenna 1454 is disposed above the section 1451 of the circuit board. In another embodiment, the WLAN antenna 1454 can be disposed below on a second side of the circuit board. A similar WLAN antenna can be disposed in a chamber on an opposite side, as illustrated in FIG. 8. In other embodiments, other dual-band WLAN antennas can be disposed in other chambers of the MRMC network device. For example, the dual-band WLAN antenna can be other types of antennas, such as helical coil antennas, loop antennas, yagi antennas, monopole antennas, PIFA antennas, or the like.

When current is applied to the WLAN antenna 1454, the WLAN antenna 1454 radiates electromagnetic energy. Because the WLAN antenna 1454 is disposed closer to the opening of the chamber 1450, the WLAN antenna 1454 can be considered an omni-directional antenna. The WLAN antenna 1454 can be designed to operate in WLAN frequency bands, such as the 2.4 GHz band and the 5 GHz band as described herein.

In the depicted embodiment, the WAN antenna 1452 and the dual-band WLAN antenna 1454 are printed on the section 1451 of the circuit board as printed circuit board (PCB) type antennas. Alternatively, the WAN antenna 1452 and the dual-band WLAN antenna 1454 can be implemented in other manners.

Figure 15:
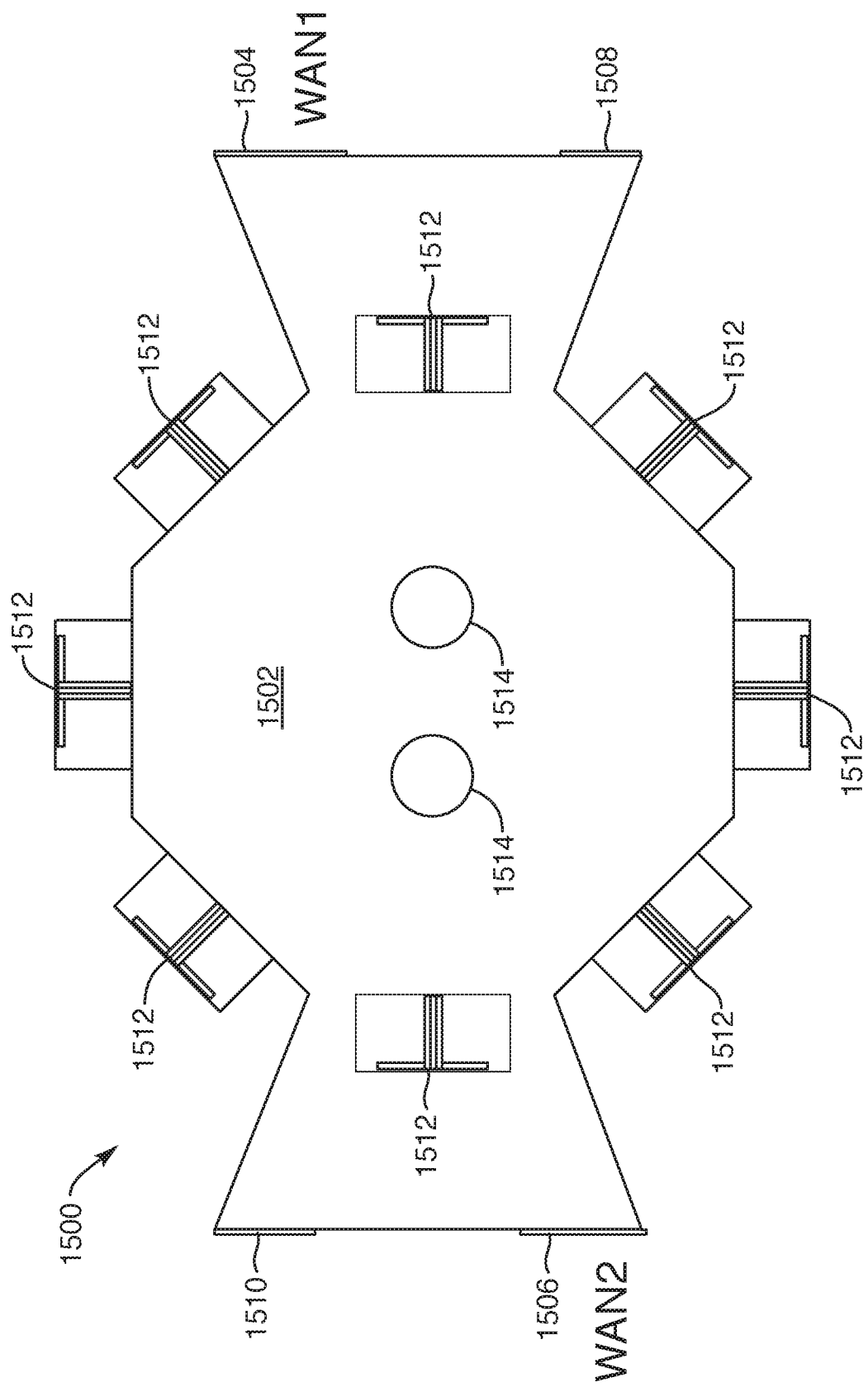
FIG. 15 illustrates a top view illustrating locations of the two WAN antennas, eight pairs of directional antennas, and two dual-band WLAN antennas on a circuit board of the MRMC network device of FIG. 8 according to one embodiment.

FIG. 15 illustrates a top view illustrating locations of the two WAN antennas, eight pairs of directional antennas, and two dual-band WLAN antennas on a circuit board of the MRMC network device of FIG. 8 according to one embodiment. The circuit board 1502 is disposed within the housing of the MRMC network device of FIG. 8. A first WAN antenna 1504 is disposed on a first section of the circuit board 1502 that extents into one of the reflective chambers as described herein. The first WAN antenna 1504 is disposed at or near an edge of the respective section of the circuit board 1502. In the same section is disposed a first WLAN antenna 1508. Similarly, the first WLAN antenna 1508 is disposed at or near an edge of the respective section. An opposing section of the circuit board 1052 is disposed a second WAN antenna 1506 and a second WLAN antenna 1510 at or near an edge of the respective section. The eight pairs of directional antennas 1512 are individual disposed at respective sections of the circuit board. The eight pairs of directional antennas 1512 may each be a pair of cross polarized dipole antennas of FIG. 9, a pair of vertical polarized dipole antennas of FIG. 10, a pair of cross polarized patch antennas of FIG. 11, or the like. In addition, a pair of antennas 1514 is disposed in an inner section of the circuit board 1502. The pair of antennas 1514 may be the pair of coil antennas of FIG. 12 or the dual-feed, dual-polarized path antenna of FIG. 13. It should be noted that the antennas of FIG. 15 can be disposed in other locations on the circuit board 1502. For example, the first WLAN antenna 1508 and second WLAN antenna 1510 can be disposed on top of the MRMC network device, such as illustrated in FIG. 16.

Figure 16:
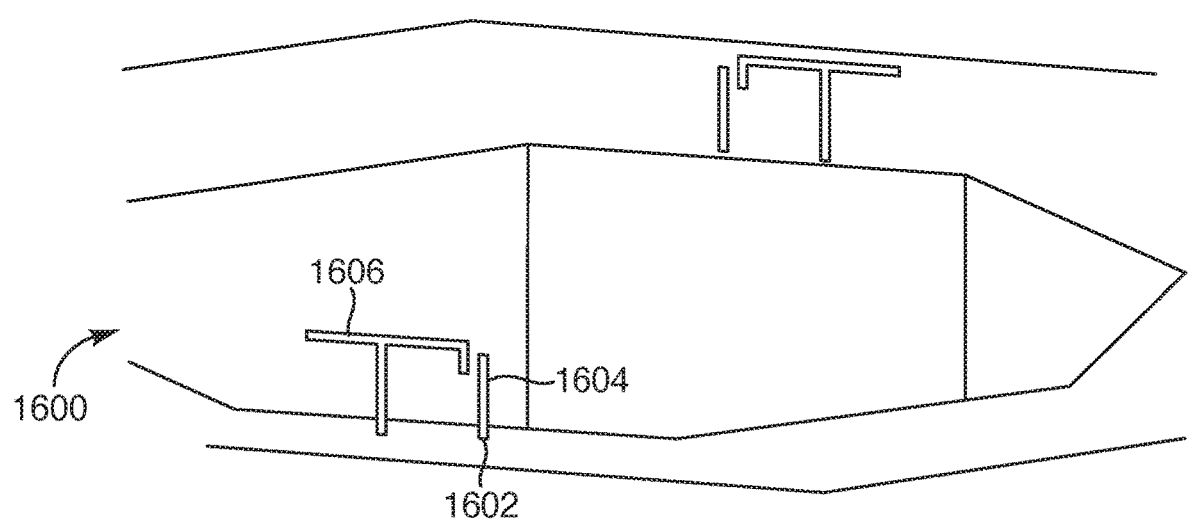
FIG. 16 illustrates a dual-band WLAN antenna of the MRMC network device at another location than within a chamber according to another embodiment.

FIG. 16 illustrates a dual-band WLAN antenna 1600 of the MRMC network device at another location than within a chamber according to another embodiment. The dual-band WLAN antenna 1600 is disposed topside of the MRMC network device. In particular, the dual-band WLAN antenna 1600 is disposed near an inner edge of the structure at the opening of the inner chamber 811 of the MRMC network device 800. The RF feed 1602 is coupled to an RF radio disposed on the circuit board that is disposed within the housing. The dual-band WLAN antenna 1600 includes a monopole element 1604 coupled to a RF feed 1602. The dual-band WLAN antenna 1600 also includes a parasitic ground element 1606 that is parasitically coupled to the monopole element 1604. In the depicted embodiment, the parasitic element 1606 is a T-monopole element. Alternatively, other types of antennas may be used for the dual-band WLAN antenna 1600. Also, the locations of the two dual-band WLAN antennas 1600 may be on or within the housing of the MRMC network device 800.

It should be noted that although the various embodiments of FIGS. 8-16 illustrate and described a metal housing having eight sectors with each of the eight sectors in the form of eight truncated pyramid structures disposed on their sides in a horizontal plane and adjacent to one another such that bases of the eight sectors form eight sides of an octagonal prism for the metal housing. In other embodiments, other shapes of the metal housing may be achieved, such as a metal housing having a pentagon, hexagon, or other polyhedron shapes. For example, an outer frame shaped as a first polyhedron with at least two reflective metal surfaces may form an individual chamber. When disposed adjacent to one another or formed as a single frame, the collective chambers can form a second polyhedron. For example, the octagonal prism of FIG. 8 has an outer frame with a first octagonal shape of reflective chambers, and the reflective chambers form an inner chamber having a second octagonal shape. The first polyhedron and second polyhedron may have the same shape, but the second polyhedron may be smaller in height, length, width, or any combination thereof. Similarly, the reflective chambers may have fewer metal surfaces than five as in the reflective chambers illustrated. For example, the reflective chamber may include two or more metal surfaces to direct the electromagnetic energy in certain directions from the metal housing. Similarly, there may be more or less of the pairs of the directional antennas, the dual-band WLAN antennas, the WAN antennas, as described above.

In another embodiment, a housing includes a first reflective chamber, a second reflective chamber, a third reflective chamber, and a fourth reflective chamber, each of the first, second, third, and fourth reflective chambers including at least three metal surfaces within a recessed region at a side of the housing. The four antennas are disposed inside respective ones of the four reflective chambers. Four radios are disposed on a circuit board and couple to the respective four antennas. The first radio is operable to cause the first antenna to radiate electromagnetic energy in a first frequency range and the first reflector chamber is operable to reflect the electromagnetic energy in a first direction away from the housing. The second radio is operable to cause the second antenna to radiate electromagnetic energy in the first frequency range and the second reflector chamber is operable to reflect the electromagnetic energy in a second direction away from the housing. The third radio is operable to cause the third antenna to radiate electromagnetic energy in the first frequency range and the third reflector chamber is operable to reflect the electromagnetic energy in a third direction away from the housing. The fourth radio is operable to cause the fourth antenna to radiate electromagnetic energy in the first frequency range and the fourth reflector chamber is operable to reflect the electromagnetic energy in a fourth direction away from the housing.

In a further embodiment, a fifth antenna and a sixth antenna are disposed inside the first reflective chamber and the third reflective chambers, respectively. Fifth and sixth radios on the circuit board are operable to cause the fifth and sixth antennas, respectively, to radiate electromagnetic energy in the first frequency range, or alternatively, in a second frequency ranges. These antennas and radios may be dual-band WLAN technologies, such as the Wi-Fi® technology. These antennas may include multiple elements, such as a monopole element and a parasitic ground element, such as described herein. In a further embodiment, seventh and eighth antennas are disposed inside the first reflective chamber and the third reflective chambers, respectively. A seventh radio, or a seventh and an eighth radio, is operable to cause the seventh and eighth antennas to radiate electromagnetic energy in a third frequency range. These antennas and radios may be any WAN type technologies, such as the LTE, 3G, 2G, or the like. These antennas may include multiple elements, such as a monopole element and a parasitic ground element, such as described herein. The embodiments described above may be disposed in a square or rectangular shape prism with four reflective chambers on the sides. In other embodiments, more than four reflective chambers may be used, such as upper and lower chambers on the top and bottom sides, as well as additional reflective chambers on the sides, such as to form a pentagonal prism, a hexagonal prism, the octagonal prism, as described herein, or the like.

In a further embodiment, there may be additional antennas disposed in additional chambers, such as an upper chamber at a top side of the housing. For example, in one embodiment, a ninth antenna is disposed in a fifth chamber and selectively coupled to the first radio. The fifth chamber has a recessed region on a top side of the housing. The fifth chamber may be reflective as described herein. The first radio, which may be a 2×2 MIMO radio as described herein, may be operable to cause the ninth antenna to radiate electromagnetic energy in the first frequency range. A tenth antenna may be disposed in a sixth chamber and selectively coupled to the third radio. The sixth chamber has a recessed region on a bottom side of the housing. The sixth chamber may be reflective as described herein. The third radio, which may also be a 2×2 MIMO radio, may be operable to cause the tenth antenna to radiate electromagnetic energy in the first frequency range. In a further embodiment, an eleventh antenna may be disposed in the fifth chamber and selectively coupled to one of the first radio, the second radio, the third radio, or the fourth radio. The ninth antenna may be a vertical orientation antenna and the eleventh antenna may be a horizontal orientation antenna. In another embodiment, a twelfth antenna is disposed in the sixth chamber and selectively coupled to one of the first radio, the second radio, the third radio, or the fourth radio. The tenth antenna may be a vertical orientation antenna and the twelfth antenna may be a horizontal orientation antenna.

In a further embodiment, a thirteenth antenna is disposed inside the first reflective chamber and a fifth radio is disposed on the circuit board and coupled to the thirteenth antenna. The fifth radio is operable to cause the thirteenth antenna to radiate electromagnetic energy in at least one of the first frequency range or a second frequency range. A fourteenth antenna may be disposed inside the third reflective chamber and coupled to the fifth radio. The fifth radio is operable to cause the fourteenth antenna to radiate electromagnetic energy in at least one of the first frequency range or a second frequency range.

In a further embodiment, a fifteenth antenna is disposed inside the first reflective chamber and a sixth radio is disposed on the circuit board and coupled to the fifteenth antenna. The sixth radio is operable to cause the fifteenth antenna to radiate electromagnetic energy in a third frequency range. A sixteenth antenna may be disposed inside the third reflective chamber and coupled to the sixth radio. The sixth radio is operable to cause the sixteenth antenna to radiate electromagnetic energy in the third frequency range.

In one embodiment, the hexagonal prism may include, in addition to the four or six chambers described above, a seventh reflective chamber and an eighth reflective chamber. In another embodiment, the octagonal prism may include these chambers and ninth and tenth reflective chambers. Pairs of antennas, including a vertical orientation antenna and a horizontal orientation antenna can be disposed within individual ones of these additional reflective chambers.

Figure 17:
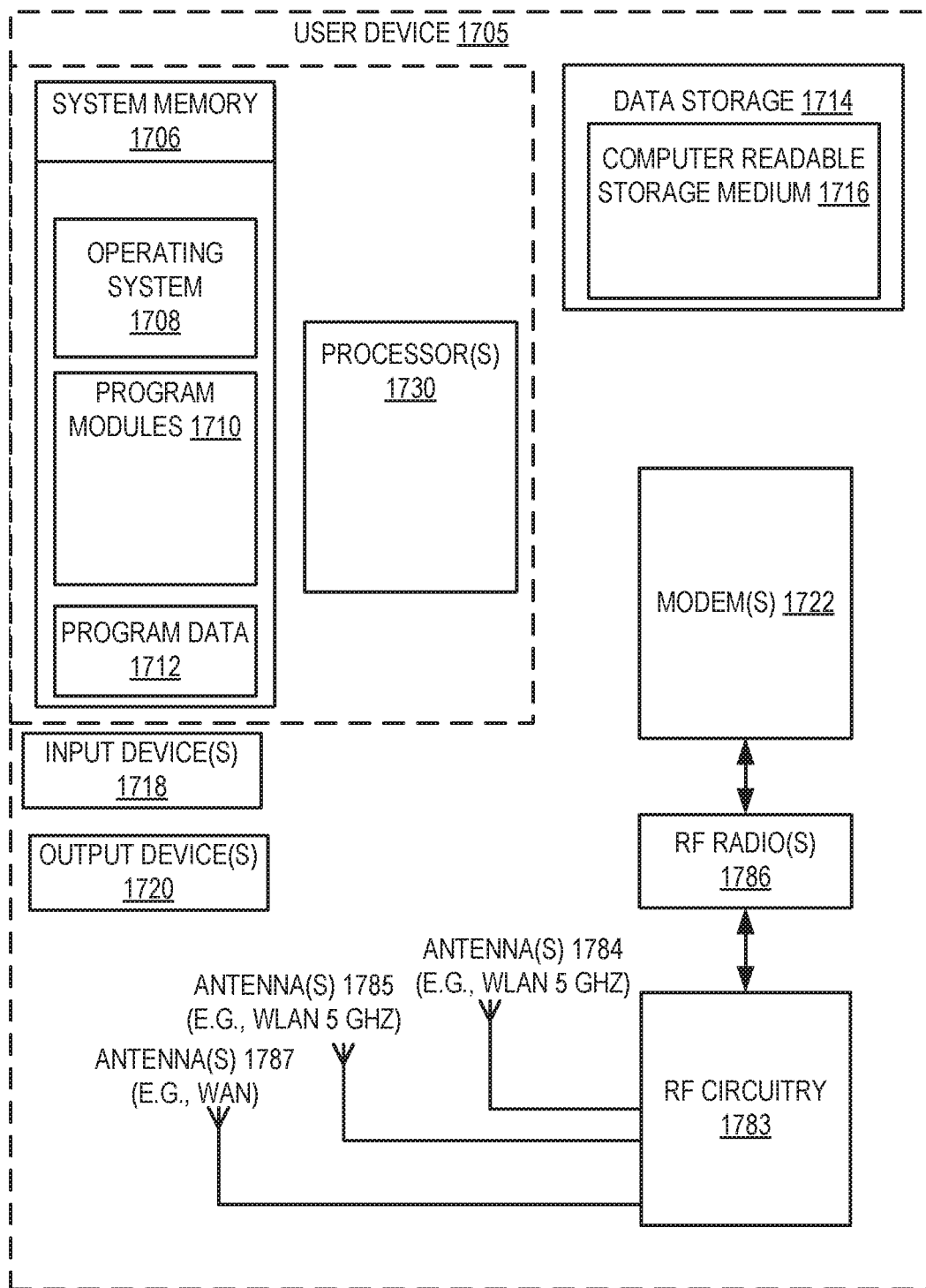
FIG. 17 is a block diagram of a network hardware device according to one embodiment.

FIG. 17 is a block diagram of a network hardware device 1700 according to one embodiment. The network hardware device 1700 may correspond to the network hardware device 102-110 of FIG. 1. In another embodiment, the network hardware device 1700 may correspond to the network hardware devices 202-210 in FIG. 2. In another embodiment, the network hardware device 1700 may correspond to the mesh node 300 of FIG. 3. Alternatively, the network hardware device 1700 may be other electronic devices, as described herein.

The network hardware device 1700 includes one or more processor(s) 1730, such as one or more CPUs, microcontrollers, field programmable gate arrays, or other types of processors. The network hardware device 1700 also includes system memory 1706, which may correspond to any combination of volatile and/or non-volatile storage mechanisms. The system memory 1706 stores information that provides operating system component 1708, various program modules 1710, program data 1712, and/or other components. In one embodiment, the system memory 1706 stores instructions of methods to control operation of the network hardware device 1700. The network hardware device 1700 performs functions by using the processor(s) 1730 to execute instructions provided by the system memory 1706.

The network hardware device 1700 also includes a data storage device 1714 that may be composed of one or more types of removable storage and/or one or more types of non-removable storage. The data storage device 1714 includes a computer-readable storage medium 1716 on which is stored one or more sets of instructions embodying any of the methodologies or functions described herein. Instructions for the program modules 1710 may reside, completely or at least partially, within the computer-readable storage medium 1716, system memory 1706 and/or within the processor(s) 1730 during execution thereof by the network hardware device 1700, the system memory 1706 and the processor(s) 1730 also constituting computer-readable media. The network hardware device 1700 may also include one or more input devices 1718 (keyboard, mouse device, specialized selection keys, etc.) and one or more output devices 1720 (displays, printers, audio output mechanisms, etc.).

The network hardware device 1700 further includes a modem 1722 to allow the network hardware device 1700 to communicate via a wireless connections (e.g., such as provided by the wireless communication system) with other computing devices, such as remote computers, an item providing system, and so forth. The modem 1722 can be connected to one or more RF radios 1786 (also referred to as RF modules or RF chips). The RF radios 1786 may be a WLAN radio, a WAN radio, PAN radio, GPS radio, or the like. The antenna structures (antenna(s) 1784, 1785, 1787) are coupled to the RF circuitry 1783, which is coupled to the modem 1722. The RF circuitry 1783 may include radio front-end circuitry, antenna switching circuitry (e.g., 424 of FIG. 4), impedance matching circuitry, or the like. The antennas 1784 may be GPS antennas, NFC antennas, other WAN antennas, WLAN or PAN antennas, or the like. The modem 1722 allows the network hardware device 1700 to handle both voice and non-voice communications (such as communications for text messages, multimedia messages, media downloads, web browsing, etc.) with a wireless communication system. The modem 1722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1722 may generate signals and send these signals to antenna(s) 1784 of a first type (e.g., WLAN 5 GHz), antenna(s) 1785 of a second type (e.g., WLAN 2.4 GHz), and/or antenna(s) 1787 of a third type (e.g., WAN), via RF circuitry 1783, and RF radio(s) 1786 as descried herein. Antennas 1784, 1785, 1787 may be configured to transmit in different frequency bands and/or using different wireless communication protocols. The antennas 1784, 1785, 1787 may be directional, omnidirectional, or non-directional antennas. In addition to sending data, antennas 1784, 1785, 1787 may also receive data, which is sent to appropriate RF radios connected to the antennas. One of the antennas 1784, 1785, 1787 may be any combination of the antenna structures described herein.

In one embodiment, the network hardware device 1700 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP device) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1722 is shown to control transmission and reception via antenna (1784, 1785, 1787), the network hardware device 1700 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A device comprising:
a first radio;
a second radio;
a third radio;
a communication interface to establish a point-to-point wireless link to a server of a content delivery network (CDN);
a storage device; and
a processing device coupled to the first radio, the second radio, the third radio, the communication interface, and the storage device, wherein the processing device is to:
receive, using the third radio, a first request for a content file directly from a fourth device via a third wireless link between the device and the fourth device;
determine that the content file is not stored in the storage device;
send, using the first radio, a second request for the content file to a second device, via a first wireless link between the device and the second device, responsive to a determination that the content file is not stored in the storage device;

send, using the second radio, a third request for the content file to a third device, via a second wireless link between the device and the third device, responsive to a determination that the content file is not stored in the storage device;

send, using the communication interface, a fourth request to the server via the point-to-point wireless link between the device and the server, wherein the communication interface is an only ingress point for content files from the CDN for a mesh network comprising at least the device, the second device, and the third device, and wherein the processing device is configured to operate with backhaul functionality for a network backbone of the mesh network, the network backbone being formed by at least the first wireless link and the second wireless link;

receive, using the communication interface, the content file from the server; and send, using the third radio, the content file to the fourth device via the third wireless link.

2. The device of claim 1, wherein:

the first radio establishes a first peer-to-peer (P2P) channel in a 5 GHz frequency band for communicating first data with the second device;

the second radio establishes a second P2P channel in the 5 GHz frequency band for communicating second data with the third device;

the third radio establishes a node-to-client (N2C) channel in a 2.4 GHz frequency band for communicating third data with the fourth device; and the device establishes a microwave communication channel of the point-to-point wireless link for communicating fourth data with the server.

3. The device of claim 1, wherein the processing device is further to:

receive a fifth request for a second content file directly from the fourth device via the third wireless link;

determine that the second content file is not stored in the storage device;

send a sixth request for the second content file to the second device via the first wireless link responsive to a determination that the second content file is not stored in the storage device;

receive the second content file from the second device via the first wireless link in response to the sixth request; and send the second content file to the fourth device via the third wireless link.

4. The device of claim 1, wherein the processing device is further to:

store a copy of the content file in the storage device;

receive a fifth request for the content file directly from a fifth device via a fourth wireless link between the device and the fifth device;

determine that the content file is stored in the storage device; and send the content file to the fifth device via the fourth wireless link.

5. The device of claim 1, wherein the processing device is further to:

receive a fifth request for a second content file directly from the fourth device via the third wireless link;

determine that the second content file is not stored in the mesh network;

generate and send a notification to an operator of the mesh network, the notification comprising information to indicate that the second content file has been requested by the fourth device; and generate and send a message to the fourth device via the third wireless link, the message comprising information to indicate an estimated delay for the second content file to be available for delivery.

6. The device of claim 1, wherein the processing device is configured to operate with access point (AP) functionality for at least the fourth device.

7. The device of claim 1, further comprising a cellular radio coupled to the processing device, wherein the processing device is further to communicate, using the cellular radio, control data with a fifth device via a cellular link between the device and the fifth device.

8. The device of claim 7, wherein the fifth device is a server of an Internet Service Provider (ISP), and wherein the processing device communicates the control data with a mesh network control service (MNCS) via the fifth device, the MNCS being executed on a remote server accessible via the Internet.

9. A network device comprising:

a first radio that operates in a 5 GHz frequency band;
a second radio that operates in the 5 GHz frequency band;
a third radio that operates in a 2.4 GHz frequency band;
a fourth radio that operates in a microwave frequency band;
a storage device; and
a processing device coupled to the first radio, the second radio, the third radio, the fourth radio, and the storage device, wherein the processing device is to:

receive, using the third radio, a first request for a content file directly from a fourth device via a third wireless link between the network device and the fourth device;

determine that the content file is not stored in the storage device;

send, using the first radio, a second request for the content file to a second device via a first wireless link between the network device and the second device;

send, using the second radio, a third request for the content file to a third device via a second wireless link between the network device and the third device;

send, using the fourth radio, a fourth request to a server of a content delivery network (CDN) via a point-to-point wireless link between the network device and the server, wherein the point-to-point wireless link is an only ingress point for content files for a mesh network comprising at least the network device, the second device, and the third device, and wherein the processing device is configured to operate with backhaul functionality for a network backbone of the mesh network, the network backbone being formed by at least the first wireless link and the second wireless link;

receive, using the fourth radio, the content file from the server; and send, using the third radio, the content file to the fourth device via the third wireless link.

10. The network device of claim 9, wherein:

the first radio establishes a first peer-to-peer (P2P) channel in the 5 GHz frequency band for communicating first data with the second device;

the second radio establishes a second P2P channel in the 5 GHz frequency band for communicating second data with the third device;

the third radio establishes a node-to-client (N2C) channel in a 2.4 GHz frequency band for communicating third data with the fourth device; and the fourth radio establishes a microwave communication channel in the microwave frequency band for communicating fourth data with the server.

11. The network device of claim 9, wherein the processing device is further to:

receive a fifth request for a second content file directly from the fourth device via the third wireless link;

determine that the second content file is not stored in the storage device;

send a sixth request for the second content file to the second device via the first wireless link responsive to a determination that the second content file is not stored in the storage device;

receive the second content file from the second device via the first wireless link in response to the sixth request; and send the second content file to the fourth device via the third wireless link.

12. The network device of claim 9, wherein the processing device is further to:

store a copy of the content file in the storage device;

receive a fifth request for the content file directly from a fifth device via a fourth wireless link between the network device and the fifth device;

determine that the content file is stored in the storage device; and send the content file to the fifth device via the fourth wireless link.

13. The network device of claim 9, wherein the processing device is further to:

receive a fifth request for a second content file directly from the fourth device via the third wireless link;

determine that the second content file is not stored in the mesh network;

generate and send a notification to an operator of the mesh network, the notification comprising information to indicate that the second content file has been requested by the fourth device; and generate and send a message to the fourth device via the third wireless link, the message comprising information to indicate an estimated delay for the second content file to be available for delivery.

14. The network device of claim 9, wherein the processing device is configured to operate with access point (AP) functionality for at least the fourth device.

15. The network device of claim 9, further comprising a cellular radio coupled to the processing device, wherein the processing device is further to communicate, using the cellular radio, control data with a fifth device via a cellular link between the network device and the fifth device.

16. The network device of claim 15, wherein the fifth device is a server of an Internet Service Provider (ISP), and wherein the processing device communicates the control data with a mesh network control service (MNCS) via the fifth device, the MNCS being executed on a remote server accessible via the Internet.

17. A method of operating a device, the method comprising:

receiving, using a third radio of the device, a first request for a content file directly from a fourth device via a third wireless link between the device and the fourth device;

determining that the content file is not stored in a storage device associated with the device;

sending a second request for the content file to a second device via a first wireless link between the device and the second device via a first radio of the device;

sending a third request for the content file to a third device via a second wireless link between the device and third device via a second radio of the device;

sending a fourth request for the content file to a server of a content delivery network (CDN) via a point-to-point wireless link between the device and the server, wherein the point-to-point wireless link is an only ingress point for content files for a mesh network comprising at least the device, the second device, and the third device, and wherein the device is configured to operate with backhaul functionality for a network backbone of the mesh network, the network backbone being formed by at least the first wireless link and the second wireless link;

receiving the content file from the serve via the point-to-point wireless link; and sending the content file to the fourth device via the third wireless link.

18. The method of claim 17, further comprising:

establishing, by the device, a first peer-to-peer (P2P) channel in a 5 GHz frequency band for communicating first data with the second device;

establishing, by the device, a second P2P channel in the 5 GHz frequency band for communicating second data with the third device;

establishing, by the device, a node-to-client (N2C) channel in a 2.4 GHz frequency band for communicating third data with the fourth device; and establishing, by the device, a microwave communication channel of the point-to-point wireless link for communicating fourth data with the server.

19. The method of claim 17, further comprising:

receiving a fifth request for a second content file directly from the fourth device via the third wireless link;

determining that the second content file is not stored in a storage device of the device;

sending a sixth request for the second content file to the second device via the first wireless link responsive to a determination that the second content file is not stored in the storage device;

receiving the second content file from the second device via the first wireless link in response to the sixth request; and sending the second content file to the fourth device via the third wireless link.

20. The method of claim 17, further comprising:

storing a copy of the content file in the storage device;

receiving a fifth request for the content file directly from a fifth device via a fourth wireless link between the device and the fifth device;

determining that the content file is stored in the storage device; and sending the content file to the fifth device via the fourth wireless link.

* * * * *